United States Patent
Combs et al.

(10) Patent No.: US 9,033,230 B2
(45) Date of Patent: May 19, 2015

(54) REVERSE MANIFESTING BY RETURNS SERVICE PROVIDER

(75) Inventors: Terry Combs, Cedar Park, TX (US); Jennifer A. Milch, Austin, TX (US)

(73) Assignee: Newgistics, Inc., Austin, TX (US)

( * ) Notice: Subject to any disclaimer, the term of this patent is extended or adjusted under 35 U.S.C. 154(b) by 2158 days.

(21) Appl. No.: 10/745,096

(22) Filed: Dec. 23, 2003

(65) Prior Publication Data

US 2004/0194056 A1    Sep. 30, 2004

Related U.S. Application Data

(60) Provisional application No. 60/446,142, filed on Feb. 10, 2003.

(51) Int. Cl.
| G06F 17/00 | (2006.01) |
| G06F 19/00 | (2011.01) |
| G06Q 30/00 | (2012.01) |
| G06K 7/10 | (2006.01) |

(52) U.S. Cl.
CPC .................................. *G06Q 30/016* (2013.01)

(58) Field of Classification Search
CPC ... G06Q 30/02; G06Q 10/08; G06Q 30/0601; G06Q 10/083; G06Q 10/0833; G06Q 30/016; G07B 17/00508; G07B 2017/0062
USPC ........... 235/385, 492, 462.01; 705/1, 53, 407, 705/401, 409
See application file for complete search history.

(56) References Cited

U.S. PATENT DOCUMENTS

| 5,715,314 | A | 2/1998 | Payne et al. ..................... 380/24 |
| 5,715,399 | A | 2/1998 | Bezos ........................... 395/227 |
| 5,724,424 | A | 3/1998 | Gifford ........................... 380/24 |
| 5,727,163 | A | 3/1998 | Bezos ........................... 395/227 |
| 5,812,668 | A | 9/1998 | Weber .............................. 380/24 |
| 5,815,657 | A | 9/1998 | Williams et al. .............. 395/186 |
| 5,828,840 | A | 10/1998 | Cowan et al. ............. 395/200.33 |
| 5,848,399 | A | 12/1998 | Burke ............................. 705/27 |
| 5,850,446 | A | 12/1998 | Berger et al. ................... 380/24 |
| 5,860,068 | A | 1/1999 | Cook .............................. 705/26 |
| 5,878,139 | A | 3/1999 | Rosen ............................. 380/24 |
| 5,889,863 | A | 3/1999 | Weber ............................. 380/25 |
| 5,899,980 | A | 5/1999 | Wilf et al. ....................... 705/26 |
| 5,937,394 | A | 8/1999 | Wong et al. .................... 705/26 |
| 5,943,424 | A | 8/1999 | Berger et al. ................... 380/25 |
| 5,960,411 | A | 9/1999 | Hartman et al. ................ 705/26 |
| 5,963,916 | A | 10/1999 | Kaplan ........................... 705/26 |

(Continued)

OTHER PUBLICATIONS

CarrierRoutes.com, "your source for information on carrier routes", p. 1.*

(Continued)

*Primary Examiner* — Thien T Mai
(74) *Attorney, Agent, or Firm* — Baker Botts L.L.P.

(57) ABSTRACT

A method of calculating shipping costs due to a carrier in connection with customer returns of items shipped to the customer by merchant. A returns center receives shipping due packages containing returned items. Affixed to each package is a printed label, the label having machine readable manifesting data, representing at least a package identifier, the origin of the package, the a delivery location. The manifesting data is scanned and the package is weighed. Data collected from the scanning and weighing steps is delivered to a processing system, which calculates shipping costs and generates a manifest report.

25 Claims, 9 Drawing Sheets

(56) References Cited

U.S. PATENT DOCUMENTS

| | | | |
|---|---|---|---|
| 5,963,924 A | 10/1999 | Williams et al. | 705/40 |
| 5,963,949 A | 10/1999 | Gupta et al. | 707/100 |
| 5,970,469 A | 10/1999 | Scroggie et al. | 705/14 |
| 5,978,774 A | 11/1999 | Rogers et al. | 705/24 |
| 5,983,208 A | 11/1999 | Haller et al. | 705/40 |
| 5,984,508 A | 11/1999 | Hurley | 364/479.07 |
| 5,987,132 A | 11/1999 | Rowney | 380/24 |
| 5,987,140 A | 11/1999 | Rowney et al. | 380/49 |
| 5,999,924 A | 12/1999 | Bair et al. | 707/4 |
| 6,002,767 A | 12/1999 | Kramer | 380/24 |
| 6,003,024 A | 12/1999 | Bair et al. | 707/3 |
| 6,006,225 A | 12/1999 | Bowman et al. | 707/5 |
| 6,015,167 A | 1/2000 | Savino et al. | |
| 6,016,480 A | 1/2000 | Houvener et al. | 705/21 |
| 6,016,484 A | 1/2000 | Williams et al. | 705/39 |
| 6,018,719 A | 1/2000 | Rogers et al. | 705/24 |
| 6,029,150 A | 2/2000 | Kravitz | 705/39 |
| 6,085,172 A | 7/2000 | Junger | 705/28 |
| 6,188,994 B1 | 2/2001 | Egendorf | 705/40 |
| 6,192,347 B1 | 2/2001 | Graff | 705/36 |
| 6,246,997 B1 | 6/2001 | Cybul et al. | 705/27 |
| 6,269,344 B1 | 7/2001 | Junger | 705/28 |
| 6,321,211 B1 | 11/2001 | Dodd | 705/26 |
| 6,327,576 B1 | 12/2001 | Ogasawara | 705/22 |
| 6,453,352 B1 | 9/2002 | Wagner et al. | |
| 6,497,408 B1 | 12/2002 | Walker et al. | 273/138.1 |
| 6,526,393 B1 | 2/2003 | Fredman | 705/408 |
| 6,536,659 B1* | 3/2003 | Hauser et al. | 235/385 |
| 6,547,136 B1* | 4/2003 | Sansone | 235/385 |
| 6,616,189 B2* | 9/2003 | Raming | 283/81 |
| 6,754,637 B1 | 6/2004 | Stenz | 705/26 |
| 6,757,663 B1 | 6/2004 | Rogers et al. | 705/24 |
| 6,834,268 B2 | 12/2004 | Junger | 705/28 |
| 6,865,560 B1 | 3/2005 | Sansone et al. | |
| 6,974,928 B2 | 12/2005 | Bloom | 209/583 |
| 6,980,962 B1 | 12/2005 | Arganbright et al. | 705/26 |
| 7,062,473 B1* | 6/2006 | Taylor | 705/402 |
| 7,197,475 B1 | 3/2007 | Lorenzen et al. | 705/26 |
| 7,376,572 B2 | 5/2008 | Siegel | |
| 8,332,282 B2 | 12/2012 | Siegel | |
| 8,380,584 B2 | 2/2013 | Siegel | |
| 2001/0011231 A1 | 8/2001 | Junger | |
| 2001/0032141 A1 | 10/2001 | Drattell | 705/26 |
| 2001/0032143 A1 | 10/2001 | Haseltine | 705/26 |
| 2001/0032147 A1 | 10/2001 | Siegel | 705/26 |
| 2001/0037207 A1 | 11/2001 | Dejaeger | 705/1 |
| 2001/0037247 A1 | 11/2001 | Haseltine | 705/22 |
| 2001/0047315 A1 | 11/2001 | Siegel | 705/28 |
| 2002/0010634 A1 | 1/2002 | Roman et al. | 705/26 |
| 2002/0010689 A1 | 1/2002 | Tibbs et al. | 705/408 |
| 2002/0013744 A1 | 1/2002 | Tsunerai et al. | |
| 2002/0019777 A1 | 2/2002 | Schwab et al. | 705/26 |
| 2002/0019785 A1 | 2/2002 | Whitman | 705/28 |
| 2002/0032573 A1 | 3/2002 | Williams et al. | 705/1 |
| 2002/0032612 A1* | 3/2002 | Williams et al. | 705/26 |
| 2002/0077976 A1 | 6/2002 | Meyer et al. | |
| 2002/0082920 A1 | 6/2002 | Austin et al. | |
| 2002/0083007 A1* | 6/2002 | Sutherland et al. | 705/62 |
| 2002/0095306 A1 | 7/2002 | Smith et al. | 705/1 |
| 2002/0128915 A1 | 9/2002 | Haseltine | 705/26 |
| 2002/0133425 A1 | 9/2002 | Pederson et al. | 705/26 |
| 2002/0138356 A1 | 9/2002 | Dutta et al. | 705/26 |
| 2002/0152093 A1 | 10/2002 | Chalmers et al. | 705/1 |
| 2002/0178076 A1 | 11/2002 | Ross | 705/26 |
| 2003/0023496 A1 | 1/2003 | De Mol Van Otterloo et al. | 705/22 |
| 2003/0061104 A1 | 3/2003 | Thomson et al. | 705/26 |
| 2003/0105704 A1 | 6/2003 | Sundel | 705/37 |
| 2003/0135432 A1 | 7/2003 | McIntyre et al. | |
| 2003/0160097 A1* | 8/2003 | Steiner | 235/385 |
| 2004/0010430 A1* | 1/2004 | Cinquini et al. | 705/7 |
| 2004/0073435 A1* | 4/2004 | Rosenbaum | 705/1 |
| 2004/0078346 A1* | 4/2004 | Amonette et al. | 705/407 |
| 2004/0083179 A1* | 4/2004 | Sesek et al. | 705/53 |
| 2004/0128265 A1 | 7/2004 | Holtz et al. | 705/406 |
| 2004/0172260 A1 | 9/2004 | Junger et al. | 705/1 |
| 2004/0193438 A1 | 9/2004 | Stashluk, Jr. et al. | 705/1 |
| 2004/0215531 A1 | 10/2004 | Stashluk, Jr. et al. | |
| 2005/0038758 A1 | 2/2005 | Hilbush et al. | 705/402 |
| 2005/0203809 A1 | 9/2005 | Stone et al. | |

OTHER PUBLICATIONS

U.S. Appl. No. 10/697,485 entitled "Merchandise Return System with Value Added Returns Processing (Data Communication)", filed by Edward J. Stashluk Jr. on Oct. 30, 2003.

UPS Autumn 2002 Forum, "The Far East is not so far," 12259 UPS Forum. ENG/SPEC 4 pages, Oct. 17, 2002.

U.S. Appl. No. 10/659,465 entitled "Method and System Using Return Labels with Dynamically Generated Multiple Datapoint Coding", filed by Edward J. Stashluk Jr. et al. on Sep. 10, 2003.

Machlis, "E-commerce = E-returns," Computerworld, v31, n51, Abstract, 1 page, Dec. 22, 1997.

U.S. Postal Rate Commission, "Opinion and Recommended Decision Approving Revised Stipulation and Agreement," Docket No. MC99-1, 35 pages, May 14, 1998.

Goldblatt, "Stores, Online Retailers Prepare for Returns," Knight-Ridder Tribune Business News, 1 page, Dec. 29, 1999.

Petersen, "Online Purchases: Easy to get, hard to return," PC Week, 30, 2 pages, Feb. 14, 2000.

"Cattron acquires Theimeg," Modern Materials Handling, Boston, vol. 55, Iss. 11, 2 pages, Oct. 2000.

"J. Crew Selects Newgistics' ReturnValet Service for Managing Product," Business Wire, 3 pages, Jan. 14, 2002.

USPTO Office Action for U.S. Appl. No. 10/750,935, inventor Philip S. Siegel, 9 pages, May 1, 2008.

USPTO Office Action for U.S. Appl No. 10/775,368, inventor Edward J. Stashluk Jr. et al., 16 pages, Jun. 12, 2008.

USPTO Office Action for U.S. Appl. No. 09/817,353, inventor Philip S. Siegel, 11 pages, Nov. 19, 2008.

USPTO Office Action for U.S. Appl. No. 10/775,368, inventor Edward J. Stashluk Jr., 18 pages, Dec. 24, 2008.

USPTO Office Action for U.S. Appl. No. 11/042,378, filed Jan. 25, 2005, inventor Edward J. Stashluk Jr., 38 pages, Feb. 12, 2009.

USPTO Office Action for U.S. Appl. No. 10/659,465, filed Sep. 10, 2003, inventor Edward J. Stashluk Jr., 14 pages, Apr. 3, 2009.

USPTO Office Action for U.S. Appl. No. 10/775,368, inventor Edward J. Stashluk Jr., 15 pages, Aug. 19, 2009.

USPTO Office Action for U.S. Appl. No. 10/659,465, filed Sep. 10, 2003, inventor Edward J. Stashluk Jr., 15 pages, Aug. 20, 2009.

USPTO Office Action for U.S. Appl. No. 11/042,378, filed Jan. 25, 2005, inventor Edward J. Stashluk, Jr., 43 pages, Sep. 19, 2009.

USPTO Office Action for U.S. Appl. No. 10/775,368, Mar. 16, 2010.

USPTO Office Action for U.S. Appl. No. 10/775,368, Aug. 5, 2010.

USPTO Office Action for U.S. Appl. No. 10/775,368, Jan. 20, 2011.

USPTO Office Action for U.S. Appl. No. 10/775,368, Apr. 7, 2011.

Examiner's Answer for U.S. Appl. No. 09/817,353, Sep. 3, 2009.

USPTO Office Action for U.S. Appl. No. 09/796,337, May 29, 2008.

Examiner's Answer for U.S. Appl. No. 09/796,337, Mar. 4, 2009.

BPAI Reversal for U.S. Appl. No. 09/796,337, May 2, 2011.

USPTO Office Action for U.S. Appl. No. 10/751,216, Oct. 23, 2008.

Examiner's Answer for U.S. Appl. No. 10/751,216, Sep. 2, 2009.

Office Action for U.S. Appl. No. 10/750,935, Nov. 18, 2008.

Office Action for U.S. Appl. No. 10/750,935, Nov. 20, 2008.

Examiner's Answer for U.S. Appl. No. 10/750,935, Jul. 28, 2009.

USPTO non-final Office Action, U.S. Appl. No. 09/817,353, inventor Philip S. Siegel, Jan. 27, 2004.

USPTO non-final Office Action, U.S. Appl. No. 09/817,353, inventor Philip S. Siegel, Aug. 25, 2004.

USPTO Final Office Action, U.S. Appl. No. 09/817,353, inventor Philip S. Siegel, Jun. 14, 2005.

Advisory Action, U.S. Appl. No. 09/817,353, inventor Philip S. Siegel, Aug. 19, 2005.

Pre-Appeal Brief Conference Decision, U.S. Appl. No. 09/817,353, inventor Philip S. Siegel, Nov. 7, 2005.

USPTO non-final Office Action, U.S. Appl. No. 09/817,353, inventor Philip S. Siegel, Mar. 10, 2006.

(56) References Cited

OTHER PUBLICATIONS

USPTO Final Office Action, U.S. Appl. No. 09/817,353, inventor Philip S. Siegel, Aug. 24, 2006.
Advisory Action, U.S. Appl. No. 09/817,353, inventor Philip S. Siegel, Nov. 8, 2006.
USPTO non-final Office Action, U.S. Appl. No. 09/817,353, inventor Philip S. Siegel, Jan. 22, 2007.
USPTO Final Office Action, U.S. Appl. No. 09/817,353, inventor Philip S. Siegel, Jul. 27, 2007.
Advisory Action, U.S. Appl. No. 09/817,353, inventor Philip S. Siegel, Oct. 15, 2007.
USPTO non-final Office Action, U.S. Appl. No. 09/817,353, inventor Philip S. Siegel, Dec. 20, 2007.
USPTO Final Office Action, U.S. Appl. No. 09/817,353, inventor Philip S. Siegel, Sep. 5, 2008.
Advisory Action, U.S. Appl. No. 09/817,353, inventor Philip S. Siegel, Feb. 4, 2009.
Appeal Docketing Notice, U.S. Appl. No. 09/817,353, inventor Philip S. Siegel, Feb. 22, 2010.
BPAI Decision U.S. Appl. No. 09/817,353, inventor Philip S. Siegel, May 17, 2012.
USPTO non-final Office Action, U.S. Appl. No. 09/796,337, inventor Philip S. Siegel, Nov. 3, 2004.
USPTO Final Office Action, U.S. Appl. No. 09/796,337, inventor Philip S. Siegel, Jun. 6, 2005.
Advisory Action, U.S. Appl. No. 09/796,337, inventor Philip S. Siegel, Aug. 25, 2005.
USPTO non-final Office Action, U.S. Appl. No. 09/796,337. inventor Philip S. Siegel, Nov. 4, 2005.
USPTO Final Office Action, U.S. Appl. No. 09/796,337, inventor Philip S. Siegel, Apr. 18, 2006.
Pre-Appeal Brief Conference Decision, U.S. Appl. No. 09/796,337, inventor Philip S. Siegel, Jul. 11, 2006.
Notice Defective Appeal Brief, U.S. Appl. No. 09/796,337, inventor Philip S. Siegel, Feb. 23, 2007.
Notice Defective Appeal Brief, U.S. Appl. No. 09/796,337, inventor Philip S. Siegel, Jul. 19, 2007.
USPTO non-final Office Action, U.S. Appl. No. 09/796,337, inventor Philip S. Siegel, Nov. 29, 2007.
Advisory Action, U.S. Appl. No. 09/796,337, inventor Philip S. Siegel, Aug. 8, 2008.
Pre-Appeal Brief Conference Decision, U.S. Appl. No. 09/796,337, inventor Philip S. Siegel, Oct. 31, 2008.
Appeal Docketing Notice, U.S. Appl. No. 09/796,337, inventor Philip S. Siegel, Jun. 3, 2009.
Notice of Allowance and Fee(s) Due, U.S. Appl. No. 09/796,337, inventor Philip S. Siegel, May 13, 2011.
Notice of Allowance and Fee(s) Due, U.S. Appl. No. 09/796,337, inventor Philip S. Siegel, Jun. 10, 2011.
Issue Notification, U.S. Appl. No. 09/796,337, inventor Philip S. Siegel, Sep. 21, 2011.
USPTO non-final Office Action, U.S. Appl. No. 09/865,470, inventor Frederick L. Ross, Aug. 5, 2004.
USPTO Final Office Action for U.S. Appl. No. 09/865,470, inventor Frederick L. Ross, Feb. 10, 2005.
Advisory Action for U.S. Appl. No. 09/865,470, inventor Frederick L. Ross, May 6, 2005.
USPTO non-final Office Action for U.S. Appl. No. 09/865,470, inventor Frederick L. Ross, Aug. 5, 2005.
USPTO Final Office Action for U.S. Appl. No. 09/865,470, inventor Frederick L. Ross, Feb. 3, 2006.
Advisory Action for U.S. Appl. No. 09/865,470, inventor Frederick L. Ross, Jun. 7, 2006.
Pre-Appeal Brief Conference Decision for U.S. Appl. No. 09/865,470, inventor Frederick L. Ross, Oct. 3, 2007.
Examiner's Answer to Appeal Brief for U.S. Appl. No. 09/865,470, inventor Frederick L. Ross, Jan. 29, 2008.
Appeal Docketing Notice for U.S. Appl. No. 09/865,470, inventor Frederick L. Ross, Oct. 17, 2008.
BPAI Decision (Ex Affirmed in Part) for U.S. Appl. No. 09/865,470, inventor Frederick L. Ross, Jul. 15, 2009.
Notice of Allowance and Fee(s) Due for U.S. Appl. No. 09/865,470, inventor Frederick L. Ross, Nov. 9, 2009.
Notice of Allowance and Fee(s) Due for U.S. Appl. No. 09/865,470, inventor Frederick L. Ross, Dec. 30, 2009.
Issue Notification for U.S. Appl. No. 09/865,470, inventor Frederick L. Ross, Apr. 21, 2010.
USPTO non-final Office Action-election restriction, U.S. Appl. No. 10/697,485, inventor Stashluk, et al., Mar. 16, 2006.
USPTO non-final Office Action for U.S. Appl. No. 10/697,485, inventor Stashluk, et al., Jun. 13, 2006.
USPTO Final Office Action for U.S. Appl. No. 10/697,485, inventor Stashluk, et al., Jan. 5, 2007.
Advisory Action for U.S. Appl. No. 10/697,485, inventor Stashluk, et al., Mar. 19, 2007.
Pre-Appeal Brief Conference Decision, U.S. Appl. No. 10/697,485, inventor Stashluk, et al., Apr. 3, 2007.
Examiner's Answer, U.S. Appl. No. 10/697,485, inventor Stashluk, et al., Sep. 28, 2007.
Appeal Docketing Notice, U.S. Appl. No. 10/697,485, inventor Stashluk, et al., Jun. 4, 2008.
USPTO BPAI Decision, U.S. Appl. No. 10/697,485, inventor Stashluk, et al., Sep. 15, 2009.
Notice of Abandonment U.S. Appl. No. 10/697,485, inventor Stashluk, et al., Nov. 25, 2009.
USPTO Office Action, U.S. Appl. No. 10/659,465, inventor Stashluk, et al., Sep. 25, 2008.
Advisory Action, U.S. Appl. No. 10/659,465, inventor Stashluk, et al., Jun. 12, 2009.
Notice of Abandonment, U.S. Appl. No. 10/659,465, inventor Stashluk, et al., Mar. 26, 2010.
USPTO Office Action, U.S. Appl. No. 10/750,935, inventor Philip S. Siegel, Jun. 14, 2007.
USPTO Final Office Action, U.S. Appl. No. 10/750,935, inventor Philip S. Siegel, Nov. 19, 2007.
USPTO Advisory Action, U.S. Appl. No. 10/750,935, inventor Philip S. Siegel, Feb. 13, 2008.
USPTO Pre-Appeal Brief Conference Decision for U.S. Appl. No. 10/750,935, inventor Philip S. Siegel, Feb. 10, 2009.
USPTO Appeal Docketing Notice, U.S. Appl. No. 10/750,935, inventor Philip S. Siegel, Nov. 20, 2009.
BPAI Decision (Examiner Affirmed in Part for U.S. Appl. No. 10/750,935, inventor Philip S. Siegel, May 1, 2012.
USPTO Advisory Action, U.S. Appl. No. 10/775,368, inventor Stashluk, et al. May 28, 2009.
USPTO Advisory Action, U.S. Appl. No. 10/775,368 inventor Stashluk, et al. Jun. 3, 2010.
USPTO Pre-Appeal Brief Conference Decision, U.S. Appl. No. 10/775,368, inventor Stashluk, et al. May 19, 2011.
Examiner's Answer to Appeal Brief, U.S. Appl. No. 10/775,368, inventor Stashluk, et al. Sep. 15, 2011.
USPTO Appeal Docketing Notice, U.S. Appl. No. 10/775,368, inventor Stashluk, et al. Dec. 28, 2011.
USPTO Patent Board Decision on Appeal—Affirmed in Part, U.S. Appl. No. 10/775,368, inventor Stashluk et al. Oct. 14, 2014.
Notice of Abandonment, U.S. Appl. No. 11/042,378, inventor Stashluk, et al. Mar. 31, 2010.
USPTO non-final Office Action-election restriction, U.S. Appl. No. 10/751,216, inventor Philip S. Siegel, Mar. 29, 2005.
USPTO non-final Office Action, U.S. Appl. No. 10/751,216, inventor Philip S. Siegel, Aug. 9, 2005.
USPTO non-final Office Action, U.S. Appl. No. 10/751,216, inventor Philip S. Siegel, Jan. 26, 2006.
USPTO non-final Office Action, U.S. Appl. No. 10/751,216, inventor Philip S. Siegel, Jul. 13, 2006.
USPTO Final Office Action, U.S. Appl. No. 10/751,216, inventor Philip S. Siegel, Dec. 27, 2006.
USPTO Advisory Office Action, U.S. Appl. No. 10/751,216, inventor Philip S. Siegel, Mar. 23, 2007.
USPTO Office Action, U.S. Appl. No. 10/751,216, inventor Philip S. Siegel, Jun. 14, 2007.

(56) References Cited

OTHER PUBLICATIONS

USPTO Final Office Action, U.S. Appl. No. 10/751,216, inventor Philip S. Siegel, Nov. 29, 2007.
USPTO Advisory Action, U.S. Appl. No. 10/751,216, inventor Philip S. Siegel, Feb. 13, 2008.
USPTO Office Action, U.S. Appl. No. 10/751,216, inventor Philip S. Siegel, May 16, 2008.
USPTO Notice of Non-Compliant Amendment, U.S. Appl. No. 10/751,216, inventor Philip S. Siegel, Jul. 9, 2008.
USPTO Supplemental Final Office Action, U.S. Appl. No. 10/751,216, inventor Philip S. Siegel, Nov. 19, 2008.
USPTO Advisory Action, U.S. Appl. No. 10/751,216, inventor Philip S. Siegel, Feb. 19, 2009.
USPTO Appeal Docketing Notice, U.S. Appl. No. 10/751,216, inventor Philip S. Siegel, Jan. 25, 2010.
USPTO BPAI Decision—Examiner Affirmed, U.S. Appl. No. 10/751,216, inventor Philip S. Siegel, May 17, 2012.
USPTO Notice of Allowance and Fee(s) Due, U.S. Appl. No. 09/817,353, inventor Philip S. Siegel, Aug. 9, 2012.
USPTO Notice of Allowance and Fee(s) Due, U.S. Appl. No. 09/817,353, inventor Philip S. Siegel, Oct. 22, 2012.
USPTO Notice of Allowance and Fee(s) Due, U.S. Appl. No. 10/750,935, inventor Philip S. Siegel, Aug. 10, 2012.
USPTO Notice of Allowance and Fee(s) Due, U.S. Appl. No. 10/750,935, inventor Philip S. Siegel, Oct. 12, 2012.
USPTO Notice of Allowance and Fee(s) Due, U.S. Appl. No. 10/751,216, inventor Philip S. Siegel, Aug. 8, 2012.
USPTO Notice of Allowance and Fee(s) Due, U.S. Appl. No. 10/751,216, inventor Philip S. Siegel, Oct. 22, 2012.

* cited by examiner

| | FIELD | EXAMPLE | NUMBER OF CHARACTERS |
|---|---|---|---|
| 1 | RETURNS PROVIDER ID | 610 | 3 |
| 2 | DESTINATION CODE | 01 | 2 |
| 3 | CONSUMER'S ZIP CODE | 61820 | 5 |
| 4 | MERCHANT ID | 0AEI (BASE 36) | 4 |
| 5 | SELECTOR | 0 | 1 |
| 6 | INVOICE NUMBER | 00000A513 | 9 |

1000

| | | | Manifest Number: | 103365693180714 |
| | | | Report: | Manifest Detail |

| PackageID | Zone | Weight | Description | Rate |
|---|---|---|---|---|
| 852500AEH00000J5TOZ | 4 | 0.8125 | First-Class Mail | 3.1 |
| 934490AEH00000IZXRK | 2 | 3.8 | Parcel Post Intra-BMC/ASF Machinable | 3.6 |
| 983720AEH00000J8YLG | 5 | 1.275 | Parcel Post Intra-BMC/ASF Machinable | 3.45 |
| 928690AEG00000J16JG | 1 | 1.75 | Parcel Post Intra-BMC/ASF Machinable | 3.04 |
| 944030AEH00000I93FU | 4 | 1.2375 | Parcel Post Intra-BMC/ASF Machinable | 3.45 |
| 981980AEG00000IOAJS | 5 | 1.8188 | Parcel Post Intra-BMC/ASF Machinable | 3.45 |
| 934010AEH00000IC443 | 2 | 3.125 | Parcel Post Intra-BMC/ASF Machinable | 3.6 |
| 956240AEG00000IZ1AC | 4 | 2.375 | Parcel Post Intra-BMC/ASF Machinable | 4.66 |
| 832010AEH00000IVFNG | 5 | 0.7438 | First-Class Mail | 2.87 |
| 834420AEG00000J8CH8 | 5 | 1.825 | Parcel Post Intra-BMC/ASF Machinable | 3.45 |
| 975200AEG00000H3RJY | 5 | 1.1562 | Parcel Post Intra-BMC/ASF Machinable | 3.45 |
| 860040AEG00000IY7MN | 4 | 1.9875 | Parcel Post Intra-BMC/ASF Machinable | 3.45 |
| 890140AEG00000J6A92 | 3 | 1.1812 | Parcel Post Intra-BMC/ASF Machinable | 3.04 |
| 913440AEH00000J8BRB | 1 | 3.3 | Parcel Post Intra-BMC/ASF Machinable | 3.6 |
| 926600AEG00000J0X9L | 1 | 0.4375 | First-Class Mail | 1.72 |
| 952230AEH00000J5TIM | 4 | 2.925 | Parcel Post Intra-BMC/ASF Machinable | 4.66 |
| 945660AEH00000J9AD2 | 4 | 2.9375 | Parcel Post Intra-BMC/ASF Machinable | 4.66 |
| 980530AEG00000IX6H3 | 5 | 1.95 | Parcel Post Intra-BMC/ASF Machinable | 3.45 |
| 958640AEG00000IUYOO | 4 | 2.25 | Parcel Post Intra-BMC/ASF Machinable | 4.66 |
| 928600AEG00000JAC09 | 1 | 0.9375 | Parcel Post Intra-BMC/ASF Machinable | 3.04 |
| 902920AEG00000J2KKA | 1 | 2.3062 | Parcel Post Intra-BMC/ASF Machinable | 3.44 |
| 952060AEG00000J8XS1 | 4 | 2.225 | Parcel Post Intra-BMC/ASF Machinable | 4.66 |
| 928780AEG00000IIBK9 | 1 | 1.5688 | Parcel Post Intra-BMC/ASF Nonmachinable | 4.39 |
| 928070AEG00000J7B8I | 1 | 0.75 | First-Class Mail | 2.87 |
| 945980AEG00000J8H0Q | 4 | 1.125 | Parcel Post Intra-BMC/ASF Machinable | 3.45 |
| 993230AEG00000J89ZP | 5 | 0.35 | First-Class Mail | 1.49 |
| 890400AEG00000IRNHC | 3 | 0.5125 | First-Class Mail | 2.18 |
| 922010AEG00000IRJZC | 1 | 0.8438 | Parcel Post Intra-BMC/ASF Machinable | 3.04 |
| 891280AEG00000J4S7H | 3 | 0.5688 | First-Class Mail | 2.41 |
| 913430AEG00000J8ABY | 1 | 4.0188 | Parcel Post Intra-BMC/ASF Nonmachinable | 5.09 |

1001  1002  1003  1004  1005

[Next 30] Records 1 thru 30 of 1935  Page [1] of 65 [go]

*FIG. 10*

REVERSE MANIFESTING BY RETURNS SERVICE PROVIDER

RELATED PATENT APPLICATION

This application claims the benefit of U.S. Provisional Application Ser. No. 60/446,142 filed Feb. 10, 2003 and entitled "Retail Package Returns Service System Using Postage Due Labels".

TECHNICAL FIELD OF THE INVENTION

This invention relates to electronic commerce, and more particularly to a method of managing returns of goods purchased from merchants.

BACKGROUND OF THE INVENTION

The growing use of electronic commerce as a customer marketplace has led to a greater need for appropriate customer return methods. In the absence of conveniently located retail stores, the customer needs an acceptable method of returning goods. Various "reverse logistics" systems have been developed to meet this need. These systems are a subset of the growing industry of "supply chain management" systems, and are designed to help merchants manage customer returns.

For returns, as opposed to forward deliveries, the typical returns process requires the customer to take the package to the carrier and pay shipping costs. As an alternative to customer-paid shipping, some merchants have turned to a merchandise return service available from the United States Postal Service (USPS), which permits the customer to use an addressed and prepaid merchandise return label. The customer may deposit the package at any post office or in a mailbox, and postage is paid by the merchant. The merchant decides the ultimate return shipping cost to the customer, such as by deducting that cost from the customer's credit.

Existing merchandise return service methods, such as that offered by the USPS, although convenient for the customer, can be costly and time consuming for the merchant.

BRIEF DESCRIPTION OF THE DRAWINGS

FIG. 10 illustrates a manifest report, generated from machine readable data on a shipping due return label, in accordance with the invention.

DETAILED DESCRIPTION OF THE INVENTION

Figure 1:
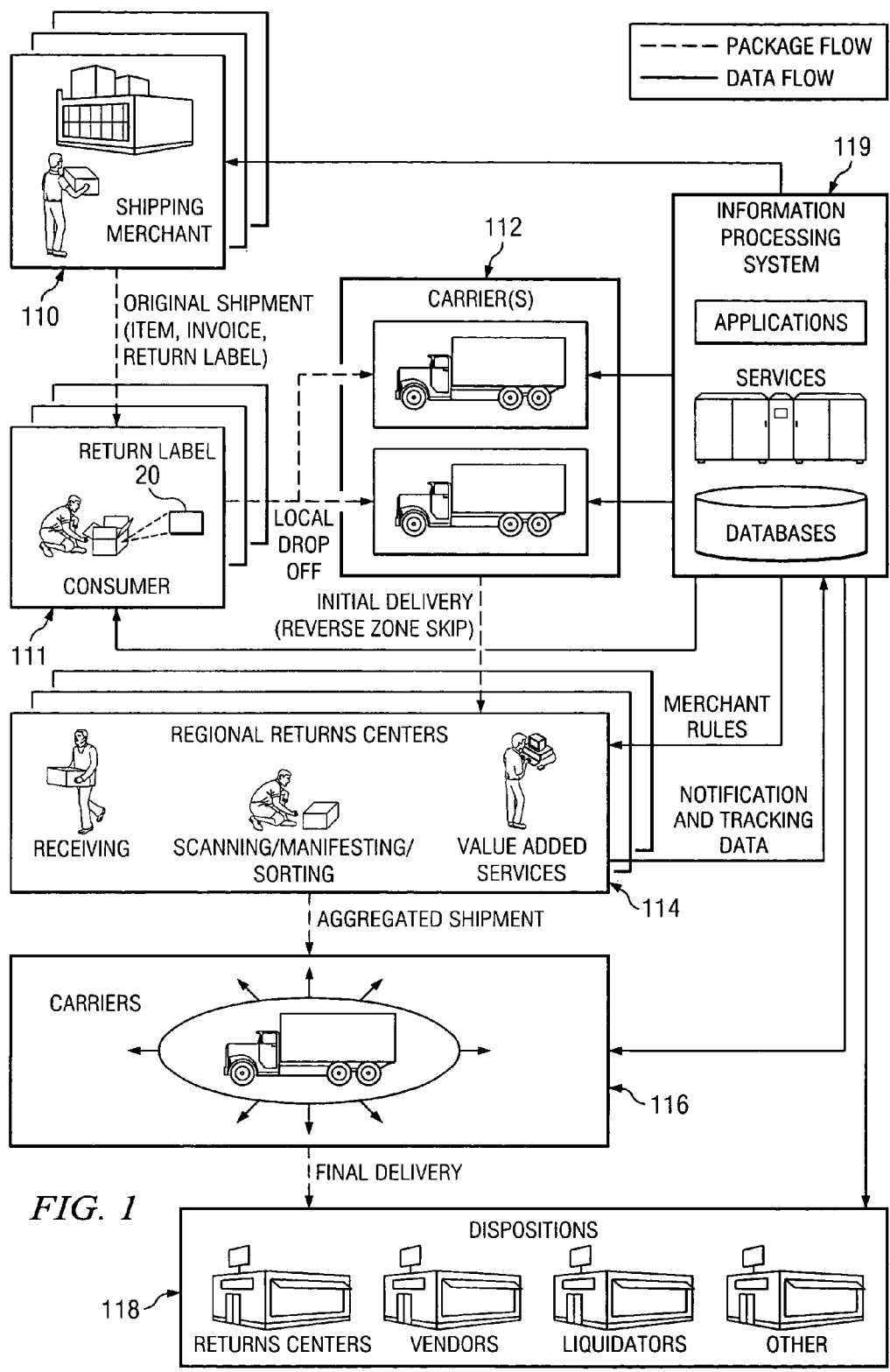
FIG. 1 illustrates a merchandise return process using shipping due return labels in accordance with the invention.

This invention described herein is a merchandising method that facilitates customer returns. As explained below, the method incorporates "reverse manifesting", which permits customers to return packages with shipping charges due (to be paid by the recipient). Unlike conventional (forward) package manifesting, the packages subject to the manifesting method described herein have already been shipped when they are manifested. The method described herein further differs from conventional postage paid shipping because packages from many different merchants are manifested together.

Once a package is received at a returns center, the label is scanned, or otherwise electronically read, and compared to stored data that includes various "rules" associated with each merchant. A processing system is used to link each return package to its associated rules, and to provide various value added services, such as notice to the merchant and/or the customer and dispositioning of the item.

The method is used by, or on behalf of, a "merchant", which is typically a retail merchant. However, the concepts discussed herein may be applied to any merchant, including service providers who sell goods incidentally to the providing of services. The "return" may be for purposes of receiving credit for an item recently purchased, but may also be subsequent to events such as warranty claims, recycling, recalls, or for repairs.

The method described herein may be used in connection with a "reverse logistics return service". This type of service is becoming increasingly popular, and permits merchants to "outsource" their returns process. For purposes of this description, these service providers are referred to as "returns providers". They typically provide returns services for a number of different merchants, with part of their services being disposing of packages in accordance with the particular disposition rules of each merchant.

If the merchant uses such a returns provider, the returns label will further have data useful for identifying each merchant and may contain other data particular to that merchant. However, the methods described herein are also useful for returns systems that handle only returns for a single merchant, such as for a merchant having an in-house returns provider.

One example of a returns service that could incorporate use of the return label described herein is the SmartLabel™ service offered by Newgistics, Inc. This service makes use of a bar-coded shipping label, typically attached to an invoice received by the customer when the product is delivered to the customer. To return the product, the customer simply affixes the label to the return package, and drops the package anywhere into the U.S. Postal System (USPS), such as by dropping it into a mailbox. The label directs the package to a returns center maintained by the service provider. The returns provider assesses shipping charges, pays the carrier, and passes the shipping costs on to the merchant, who may then deduct those costs from the customer's credit for the returned item. The various services that the returns provider provides to the merchant include the return label, aggregation of packages to each merchant, transportation and processing services, payment of shipping charges, reporting, and notifications to the merchant and/or the customer.

For purposes of example herein, it is assumed that the carrier that ships the returned items is the United States Postal Service. However, the same concepts could be applied to a returns process that uses other carriers or multiple carriers, so long as each carrier has the equivalent of shipping due capability, that is, the ability to collect shipping charges after the package is delivered, that is, from the returns provider (the package recipient) rather than from the customer.

Overview of Returns with Reverse Manifest Shipping

FIG. 1 illustrates a returns process that uses shipping due return labels in accordance with the invention. In the embodiment of FIG. 1, returns are processed through a returns provider that handles returns for multiple merchants. However, as stated above, the method described herein may be easily adapted for a returns provider that handles only returns for a single merchant. In either case, the merchant is considered to "maintain" at least one returns center, whether by directly maintaining the returns center(s) or by associating with a third party that does so.

In Step 110, a merchant has delivered an item to a customer. In Step 111, the customer has decided to return the item, herein referred to as "the return item".

A returns label 20 has already been, or is to be, provided to the customer. In the example of FIG. 1, the return label 20 is delivered as an enclosure with the customer's original order, such as by being part of the customer invoice or a separate insert.

In other embodiments, return label 20 could be downloaded from a data network and printed by the customer, or otherwise delivered to the customer by means other than being included with the merchandise delivery. For example, the return label 20 could be separately mailed or sent by facsimile. As another example, the customer might access a website provided by the merchant, link to a returns page, and download the data for printing the return label.

Return label 20 is "pre-authorized" in the sense that the customer need not seek authorization from the merchant. The customer is apprised by the merchant that returns are pre-authorized, such as by information on the invoice or other shipping documents. The notification may be explicit on the return label or elsewhere or may be implicit. The customer is further apprised that the customer need not pay shipping charges, such as by a "no postage necessary" printing on the return label 20.

An example of a suitable return label 20 is described below in connection with FIGS. 2 and 3.

The customer affixes the returns label 20 to the packaging for the return item, and hands over the return item to a carrier, without paying any shipping charges to the carrier. The customer need not affix any indicia of postage or other shipping costs to the packaging. In the example of this description, where the carrier is the U.S. postal system, the customer may simply deposit the package into the U.S. postal system, by putting it into a mailbox (if postal compliant), dropping it off at a postal drop, or taking it to a post office. Similarly, for other carriers, the customer may locally deposit the package with the carrier or have it picked up. The return is local to the customer in the sense that the customer may select whatever drop-off (or pick-up) point is most convenient.

As further explained below in connection with FIG. 2, return label 20 is preprinted to indicate at least the destination for the item and the package origin (the point where the customer places the package with a carrier). Typically, the destination and origin are identified by addresses, including postal codes. For purposes of this description, "postal codes" include the ZIP (zone improvement plan) codes of the USPS and similar codes used in other countries.

The returns label further indicates that delivery charges are to be paid by a recipient. It further identifies the transaction leading to the return. Typically, this is a purchase transaction and the identification is by invoice number or other indicia of the package or its contents. In other embodiments, the transaction could be a warranty claim or repair request.

In Step 112, the carrier delivers the return item to the returns provider. As stated above, in the embodiment of FIG. 1, the initial point of return for the package is a specialized returns center, which may receive returns for more than one merchant. The returns center may be regional for a large area such as the United States. In other words, a large geographic area may have a number of returns centers.

For a returns provider having regional returns centers, the return label 20 may ensure "reverse zone skipping". At the time the data for each returns label 20 is composed, the destination address on the label 20 is determined.

The destination address is typically that of a carrier station (such as a postal center) nearest the customer. This may mean that return packages are carried from the customer drop-off location to a destination associated with the carrier for pickup by the returns provider. For example, where the carrier is the USPS, the package could be delivered to one of 21 regional bulk mail centers (BMCs). The package is delivered to the BMC closest to the location of the returns provider. The returns provider may then pick up accumulated packages addressed to it, or the carrier may deliver the package directly to the returns center. In either case, the destination address is considered to be "to" a returns center closest to the customer.

In Step 114, the returns provider receives the package from the carrier. The returns provider scans the return label on the package and weighs the package. Any special shipping flags or indicia are entered at this time. In this manner, the returns provider receives multiple packages, which may be items originating from multiple merchants, throughout a daily course of business.

In a process known as "manifesting", the returns provider calculates the shipping charges due to the carrier and electronically manifests the carrier. Typically, this is done on a daily basis. In the example of this description, the returns provider pays the carrier, and is compensated by the merchant for carrier costs and other services.

The returns provider then sorts the packages by merchant, again using data printed on return label 20, and collects the packages associated with each merchant. The final destination code is encoded on the return label, and may also be printed in human readable form. For large volume merchants, the destination code may be associated with a package chute and/or a docking door.

The returns provider may also provide "value added" services for the benefit of the merchant, such as notification of the return to merchant or notification to the customer of receipt of the package. For example, the returns provider may use the scanned return label information to notify the customer and/or the merchant that the package has been received.

In Step 116, after aggregating the packages for each merchant, the returns provider further ships them in accordance with whatever policies are specified for that merchant. For example, the returns provider may palletize shipments back to the merchant. The return label data is used to create a bill of lading, with data such as pallet counts, package counts, and shipment weight.

In Step 118, the package is handled according to the disposition policy of the merchant, such as by being returned to stock, sent to a re-seller, liquidator, or otherwise disposed.

A processing center 119 is used to collect data scanned from return labels, and to process the returns. The processing center 119 includes computer processing equipment, including computers, data storage, and networking equipment, appropriate for communication of data to and from returns centers, merchants, and customer, as appropriate.

The computing equipment is programmed to fulfill the various data processing services described herein. For example, processing center 119 may provide a web page or other network-accessible data source, accessible by customers for obtaining information about returns and data for printing return labels. It also stores business rules from merchants, which are typically delivered to it by electronic transmission over a data communications network. As explained below, the processing center 119 match data on the return label to these merchant rules, which may specify disposition of the package or other rules for handling the return.

Returns Label Provided to the Customer

Figures 2, 3:
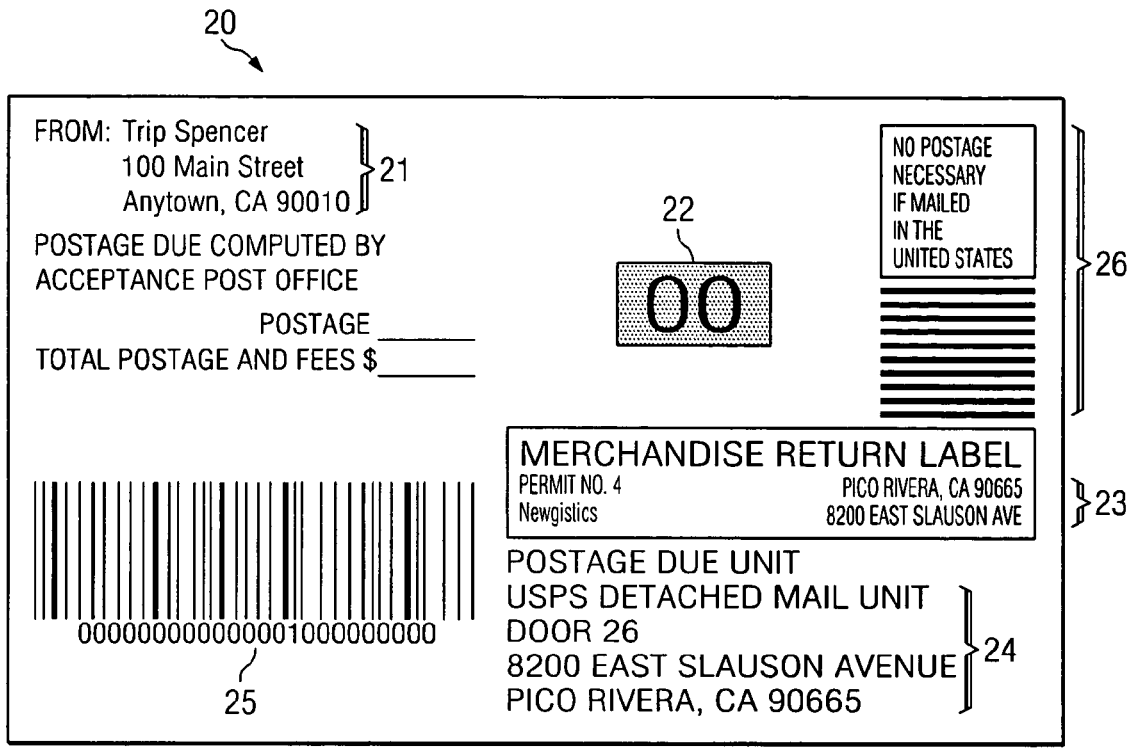
FIG. 2 illustrates a return label in accordance with the invention.
FIG. 3 illustrates an example of bar code fields for the bar code of FIG. 2.

FIG. 2 illustrates an example of a return label 20, suitable for use with the merchandise return method of FIG. 1. In the example of FIG. 2, the carrier is the USPS. Return label 20 incorporates data appropriate for the merchandise return service offered by the USPS, as well as data used for additional services provided by the returns provider. As stated above, other or additional carriers having the equivalent of shipping due capabilities could be used, in which case, return label 20 would be modified to comply with the requirements of those carriers.

The customer's address 21 is printed on the upper left corner of label 20. This address matches the original delivery address.

The visual flag 22 is a human readable code, that can be used for various purposes. In the example of this description, flag 22 is a destination code that indicates a final package destination. Examples of final destinations are a merchant's warehouse, a liquidator, or a warranty, recall or repair center. This destination code may match a destination code embedded in barcode 25. In other embodiments, flag 22 could correlate to any sort of business "rule" of a merchant. As another example, visual flag 22 could indicate a quality of service, such as whether the package is to expedited or held for some reason. Or flag 22, could indicate the contents of the package, such as whether it is "high value" for special handling.

In general, flag 22 permits the package to be manually sorted at the returns center for subsequent routing. The examples set out above for its use are merchant-specific, in the sense that the flag is specific to a particular merchant and its returns processing rules. The flag, being human readable, can be easily correlated to rules displayed on a display in communication with processing system 119. These displays can be conveniently located at stations at the returns center and the displayed information used for sorting and other handling decisions.

The merchandise return rectangle 23 is specific to the carrier and pertains to the relationship between the carrier and the returns provider. In the example of this description, it states the USPS permit information of the returns provider.

The delivery address 24 is, as explained above, the address of a delivery location that is geographically nearest the customer. This determination of this address is dependent on the customer's postal code, as specified during the transaction leading to the return (such as the purchase transaction). As stated above, the delivery address could be a carrier center, such as a USPS bulk mail center, where it is held for pickup by the returns provider.

Barcode 25 is a dynamically generated machine-readable code that is based on unique information about the specific transaction involving the item(s) being returned. An example of barcode data is described below, but in general, the barcode data provides data for information servers 119 so that various "value added" returns processing tasks may be performed, such as manifesting of shipping charges, notifications to the customer and/or merchant, and final disposition of the returned item.

The barcode data permits the returns center to correlate the returned item back to the transaction with the customer. One type of correlation is an invoice number, as indicated by the example below.

Barcode 25 may comprise various alphanumeric or numeric only formats. Various other types of machine readable coding could be used as an alternative to bar-coding, such as other types of optical scan data or radio frequency identification (RFID) tagging. The coding may be printed or may be some other format, such as the electronic circuitry used in an RFID tag. For purposes of this description, all coding read by equipment to be formatted for electronic or optical processing is referred to as "machine readable" coding.

The "shipping due" insignia 26, including the horizontal bars 26a, indicates to the customer and the carrier that shipping charges are to be paid by the recipient.

Barcode 25 is a "third party barcode" in the sense that need not be specified by the carrier, which in this case, is the USPS. Although not shown in FIG. 2, return label 20 may have one or more additional barcodes, for example a barcode containing data for the carrier's use, such as for carrier tracking or return confirmation.

FIG. 3 illustrates a data string that is an example of the contents of the barcode 25 of FIG. 2. The example of FIG. 3 has 24 positions, each with an alphanumeric character. The information in barcode 25 is "integrated" in the sense that it is contained in a single barcode or other machine readable string of data. Information in other machine readable coding may be integrated in a similar manner.

The barcode 25 contains multiple data points, and contains data that is "transaction specific", in the sense that it identifies the transaction between the customer and the merchant or other party to whom the package is being delivered. The "transaction specific" data is dynamically generated in the sense that it is generated after the original order is made, and is specific to that transaction.

In general, the barcode data points are used to process the package for purposes other than moving it from one place to another. In contrast, "carrier specific" data elsewhere on the label 20 functions merely for shipping purposes.

Field 1 identifies the returns provider. Field 2 identifies the package destination.

Field 3 represents the shipping origin of the package (customer's postal code), which permits assessment of shipping charges from where the customer drops off the package (the return package origin) to the returns center (or a nearby BMC) where it is pulled from the carrier.

Field 4 identifies the merchant from whom the item was purchased. Or, as explained above, some party other than the merchant may be involved in the transaction leading to the return, such as a warranty or repair service.

Field 5, a selector field, may be used for various purposes, such as to identify the label type, or to identify a shipping category, such as Priority Mail or customer-paid.

Field 6 identifies the transaction involving the returned item in some manner. This is typically the purchase transaction, such as in the case of a customer returning recently purchased goods. This terminology is used herein for sake of consistency. This field is used to correlate the return label to the original order, such as by filling the field with the invoice number. This field could also be used for data such as a customer number, product number (such as an SKU), or other data.

As explained below, data on barcode 25 may be used to correlated the package (or the item inside) to merchant business rules. This involves identifying the merchant or the specific purchase transaction. Any date that permits such identification, whether explicitly or inferentially, may be sufficient for correlation of business rules.

If desired, one or more of the above-described fields could be omitted and another field used to link to the same information at the returns center. For example, Field 3 (the customer's postal code) could be omitted and Field 6 used at the returns center to dynamically link to stored data that provides the customer's postal code. In this event, barcode 25 would equivalently be considered to contain "data representing at least the origin of the package and identification of the transaction".

It should be understood that the barcode data in the example of FIG. 3 is minimal and additional data could be easily included. Additional data points that may be included in the barcode 25 include data points falling into categories "transaction specific", "merchant specific", "customer specific", "product specific", "trading partner", or "disposition" data. "Transaction specific" data identifies the transaction, such as by invoice number in the case of a purchase transaction. The "merchant specific" data identifies the merchant or some characteristic of the merchant. The "customer specific" identifies the customer or some characteristic of the customer. "Product specific" data identifies the package contents, such as by SKU number. "Trading partner" data describes a trading partner of the returns center, such as a liquidator or other service provider. "Disposition" data describes a disposition rule or final destination of the returned item.

Often, the merchant directly provides the return label (or data for generating the return label) to the customer. To this end, the returns provider provides the label specifications to the merchant, as well as a delivery address data file. This data file is used to correlate each customer's postal code to the returns provider location that is closest to the customer. The data file is made available to the merchant via data network access, such as by the internet.

In the example of FIGS. 2 and 3, the data on the returns label 20 is pre-printed. In other embodiments, the customer might fill in at least some of this data. For example, label 20 could have a predetermined format, and the customer would be directed to fill in certain information such as the customer's address, the package invoice number, or a shipping destination. However, in general, regardless whether label 20 is entirely pre-printed or all or partly filled by the customer, it is deemed to have a predetermined format, and prior to being shipped by the customer, to contain certain customer data as discussed in connection with FIGS. 2 and 3.

The various data elements described above in connection with FIGS. 2 and 3 can be used to implement the various returns services described herein, and some of these concepts may be implemented independently of others. For example, by using data representing the origin of the package (such as the customer's postal code), the returns center can perform reverse manifesting. By using data representing the original shipment (such as the identity of the merchant, the invoice, or the item), the returns center can dynamically route the package or notify the merchant or the customer about the status of the return.

Use of the Returns Label

Figure 4:
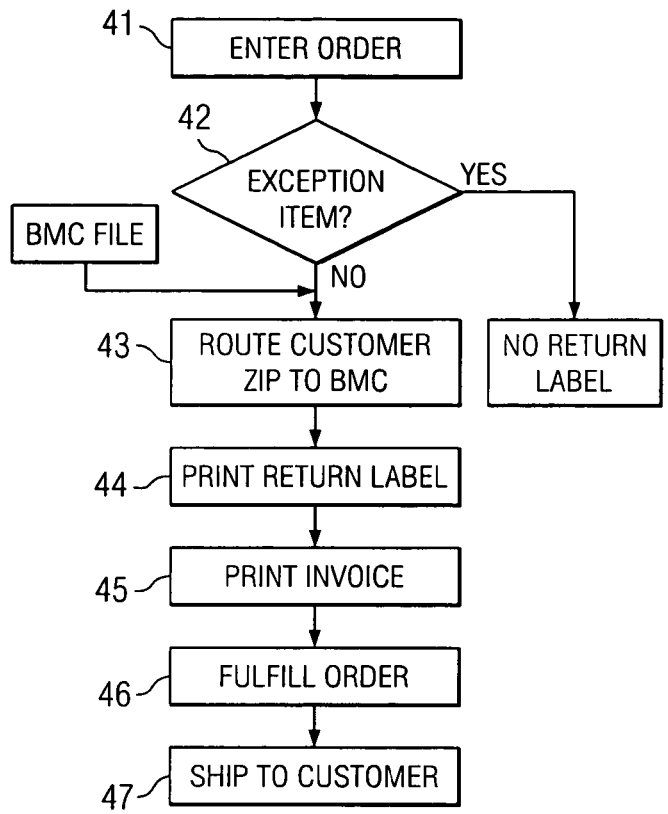
FIG. 4 illustrates a method of generating a return label in accordance with the invention.

FIG. 4 illustrates a process of generating a return label, such as return label 20. In the example of FIG. 4, the return label 20 is to be provided to the customer in the original shipment. In Step 41, the merchant enters the order information to an automated order processing system. In Step 42, the merchant determines whether the order is an exception item. In Step 43, the merchant receives BMC (bulk mail center) data, which as explained above, is used to determine the BMC closest to the customer. In other embodiments, where the carrier is not the USPS, the address of some other carrier station close to the customer is used. In Steps 44 and 45, the return label and invoice are printed. In Steps 46 and 47, the order is fulfilled and shipped to the customer, with the return label being enclosed with the order.

Figure 5A:
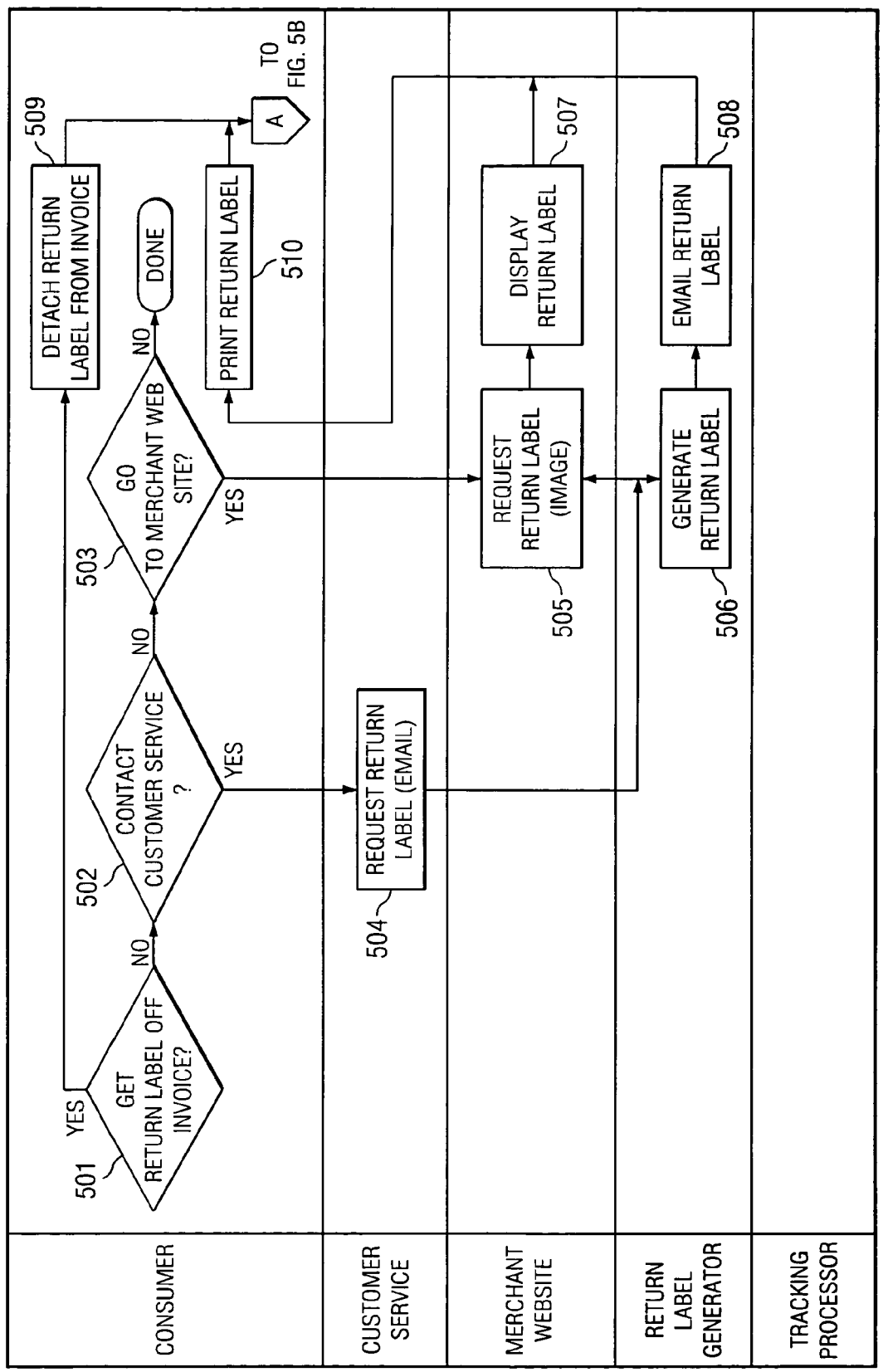
FIGS. 5A-5C illustrate the use of the return label.
Figure 5B:
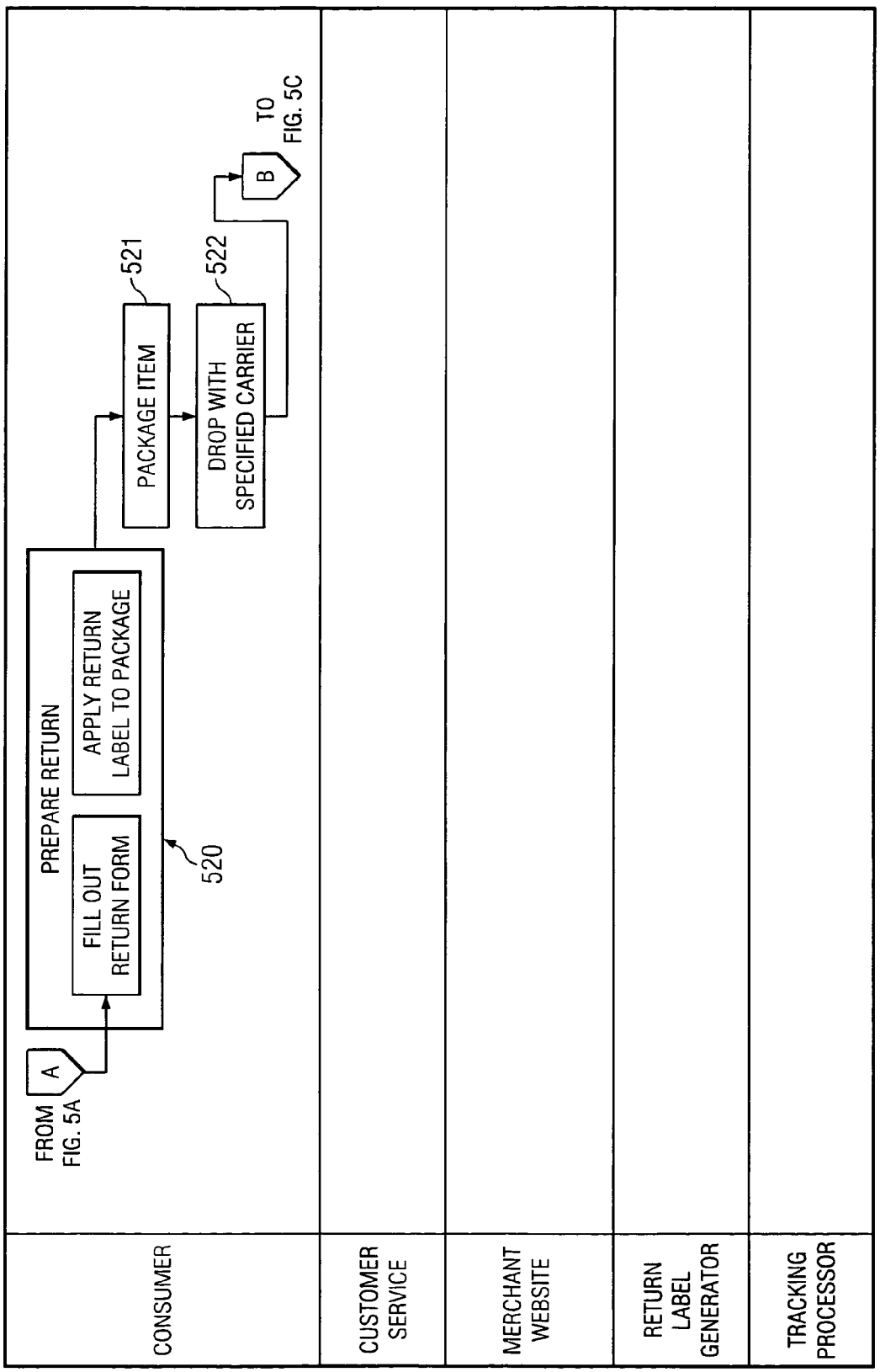
Figure 5C:
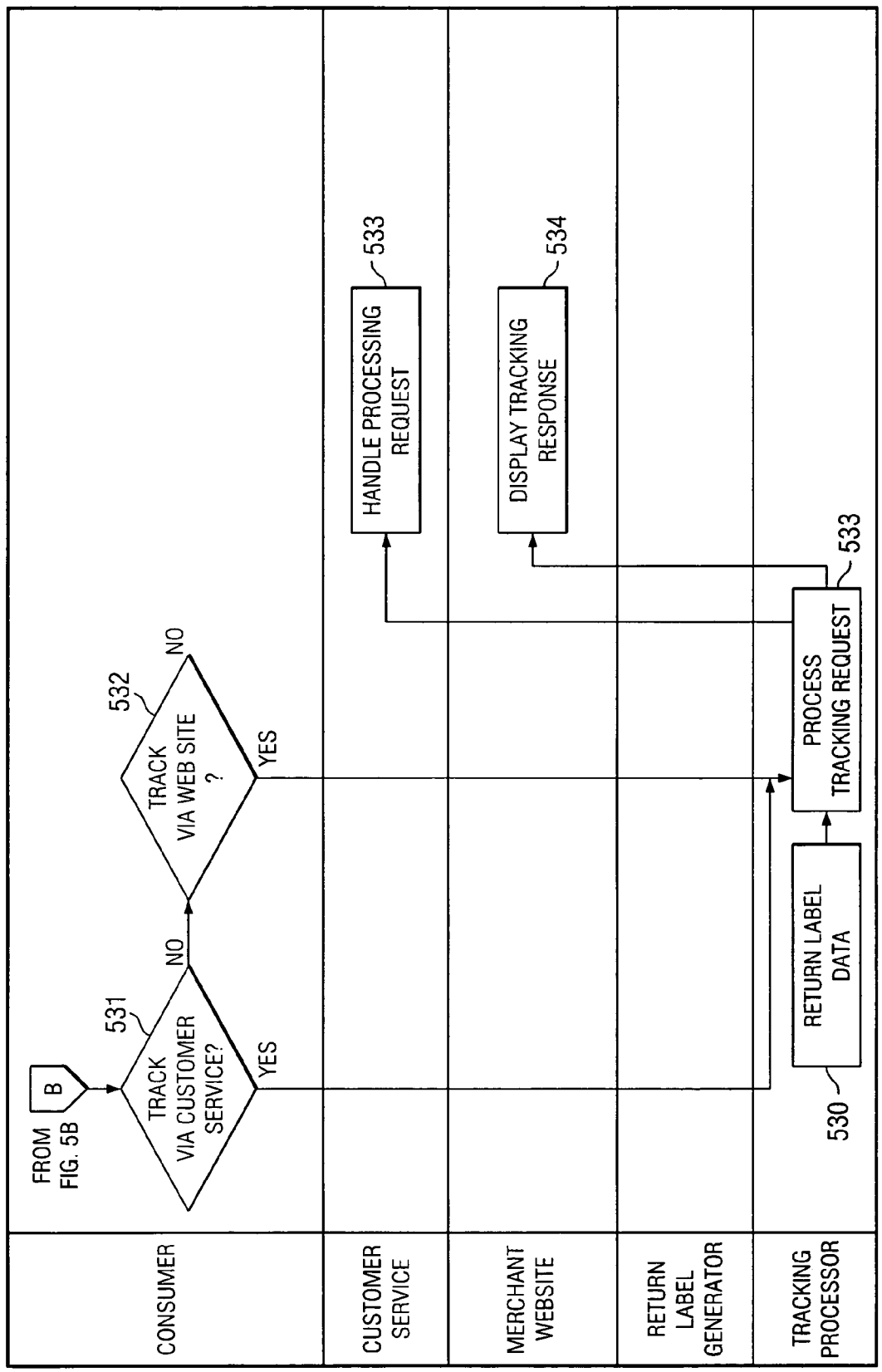

FIGS. 5A-5C illustrate the use of the return label 20. Steps 501-510 illustrates various alternative ways for the customer to obtain the label 20. In Step 501, the customer receives the label 20 with the invoice in the original shipment, as described above in connection with FIG. 4. The customer may merely detach the label (Step 509).

In Step 502, the customer receives the label 20 by contacting customer service of the merchant, such as by phone call or email (Step 504). The label is then generated (Step 506) and emailed to the customer (Step 508).

In Steps 503 and 505, the customer receives the label by accessing a website and requesting an image. The label is generated and displayed (Steps 506 and 507) and the customer prints the label (Step 510).

In Step 5 label 20, the customer prepares the return by filling out a return form and applying the return label to the package. In Steps 521 and 522, the customer packages the return and drops it with the carrier specified by the merchant.

Steps 530-536 illustrate how data from the return label can be used to facilitate tracking requests. In Step 530, the package has been received at the returns center and scanned as described above in connection with FIG. 1. The data is stored and accessible by a tracking process, which may be part of processing system 119.

In Step 531, the customer makes a tracking request through customer service of the merchant. In Step 533, the request is processed, and the results communicated to the customer. In Step 532, the customer makes a tracking request via the merchant's website. In Steps 533 and 534, the request is processed and the results are displayed.

Figure 6:
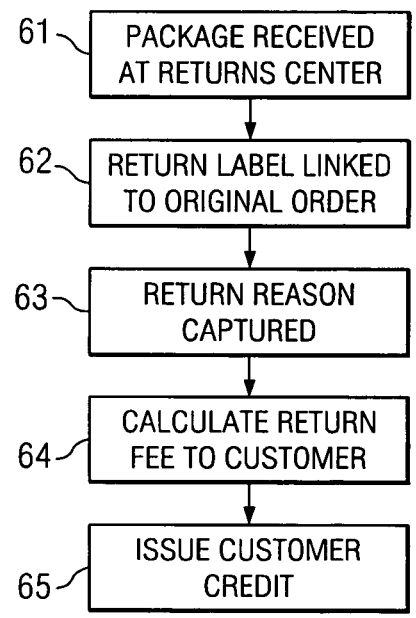
FIG. 6 illustrates the use of the return label at the return center for issuing customer credit.

FIG. 6 illustrates an example of the use of return label 20 for issuing credit to the customer. FIG. 6 is an expansion of one aspect of the returns center processing in Step 114 of FIG. 1.

In Step 61, the package with the return label affixed is received at the returns center. It is assumed that return label 20 has at least some means to correlate the package to the original order, such as an invoice number. In Step 62, the label is scanned and linked to the original order. In Step 63, the reason for the return is captured, such as by reading the return form. The reason for the return may be used to determine whether the customer is to bear shipping costs for the return, and hence the amount of credit to the customer. The return reason may be communicated to the merchant, in addition to other return information, using processing system 119. In Step 64, the credit due the customer is calculated. Step 64 may involve accessing stored business rules of the merchant. In Step 65, data for implementing credit to the customer is delivered to the appropriate processing center.

Value Added Returns Centers

Figure 7:
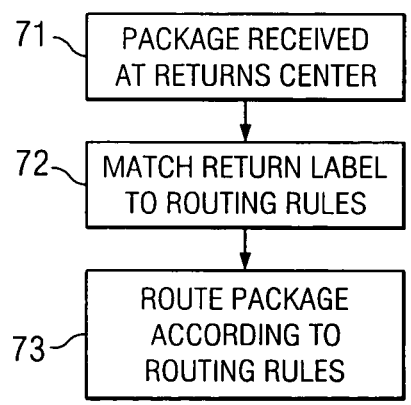
FIG. 7 illustrates a process of dynamic routing, using data on the return label.

FIG. 7 illustrates how the data on returns label 20 can be used to implement "dynamic routing". In Step 71, the package is received at a returns center. In Step 72, at the returns center, using processing system 119, data on barcode 25 is linked to the merchant's specifications for routing the package to its final destination. In Step 73, the package is routed in accordance with whatever specifications are current at that time. For example, the original shipment data may indicate that a package contains a seasonal item. At the end of the season, these packages may then be routed to an outlet destination rather than a re-stock destination. As another example, for a returns center that handles packages for more than one merchant, the original shipment information might merely identify the merchant. The returns center can then match the packages of that merchant to the current rules for that merchant, such as by routing all packages to a particular destination.

Figure 8:
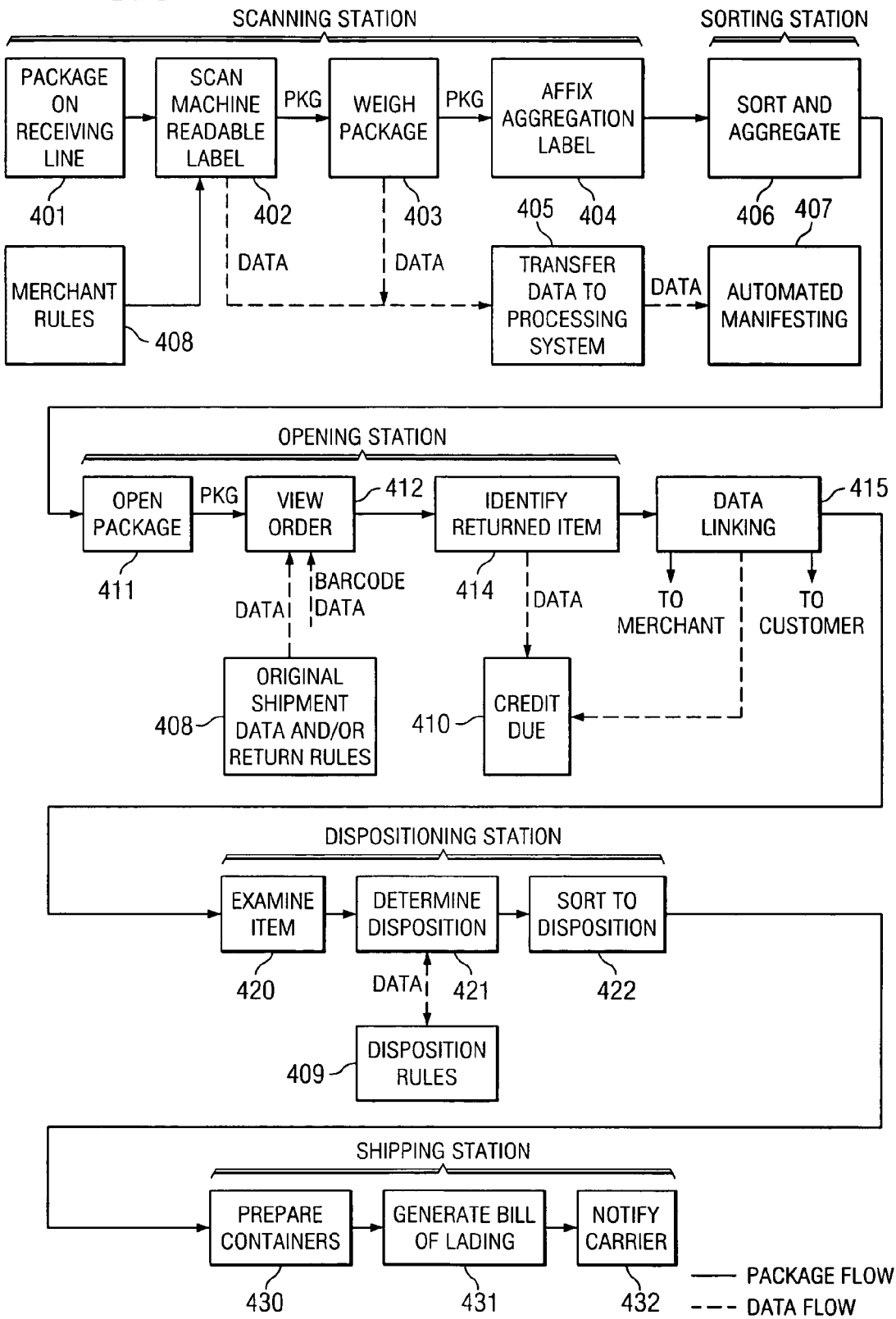
FIG. 8 illustrates one embodiment of a method of handling returns at a value added returns center, such as the returns center of FIG. 1.

FIG. 8 is an expanded illustration of the services provided at a returns center, Step 114 of FIG. 1. Both the path of packages as they physically move through the return center and the data path of data pertaining the packages are shown. The movement of packages through the return center can be by conveyor belt or any other convenient means. The data path may be achieved by conventional computer networking software and equipment, implemented with processing system 119.

At the returns center many different services can be provided for the benefit of the merchant, so that the merchant's costs from customer returns are minimized and customer satisfaction enhanced. As explained below, these services include notification of the return to the merchant and/or the customer, item level sorting, and item disposition. These services are "rules-based", which means that the merchant provides rules that are stored in processing system 119, which uses machine readable return information from the package to associate the item with the appropriate rule(s). Processing system 119 is used to store the machine readable data so that it may be displayed at any one or more of the various returns processing stations described below.

In actual implementation, the returns system is best implemented with a number of returns centers, distributed throughout a geographic region such as the United States. Among other advantages, the use of distributed returns centers decreases shipping costs by permitting "reverse zone skipping". This means that packages are initially delivered to a returns center closest to the customer. From the returns center, packages to common destinations are aggregated and shipped to its final destination. The result is a shipping process that is more expeditious than if each package were required to be shipped all the way from the customer to its final destination.

Steps 401-404 are performed at a scan station by a scan station operator. In Step 401, the incoming package is placed on a receiving line. In Step 402, the machine readable code on the package label is scanned. In Step 403, the package is weighed and the weight recorded. In Step 404, the operator places a label on the package indicating how the package is to be aggregated with other packages, such as by merchant, quality of service, or disposition. This label is for internal use at the returns center and can be machine readable, human readable, or both. In Step 405, the data collected at the scan station is transferred to processing system 119, which creates and stores a data file for the package.

Step 406 is performed at a sorting station, where a sorter identifies the package destination and places the package in a container for packages similarly aggregated. Depending on the returns rules for the merchant, items can be categorized by product category or disposition.

Step 407 is a manifesting step, performed by processing system 119, which occurs after Step 405 independently of the remainder of the physical path of the packages. In Step 407, the package data files are used to generate a manifesting report representing shipping charges for all packages received in a batch. Typically, manifesting is performed on a daily basis. The manifest report is delivered to the carrier, which audits the manifest and collects shipping charges.

Steps 408 and 409 are also performed by processing system 119, and entail communicating various data to and from the merchant associated with the returned package.

Step 408 involves receiving and storing merchant business rules, which permit the merchant to specify how packages are to be handled. As explained herein, these rules permit packages to be handled according to any categorization desired by the merchant. For example, the merchant may specify "all shoes go to charity" or "all men's shoes go to charity and all women's shoes go to an outlet". Returns rule may govern any phase of the returns processing and may be as complex as desired by the merchant. For example, returns rules for notifications may be as simple as a single rule for all returns that specifies "notify merchant".

Step 409 involves accessing the merchant order associated with the returned package. This step may be used to correlate data from return label 20 (especially scanned data from barcode 25) to additional data about the returned item(s).

Step 410 involves communicating return information to the merchant and/or the customer. For example, as explained below, data collected at an opening station may be used to apply a credit to the customer's account with the merchant. The type of information delivered about the return and to whom it is delivered, and when and how delivered, may all be specified in the merchant's business rules.

The data may also be used to send return notification and other return information to the merchant. The data may further be used to notify the customer of receipt of the package, and perhaps also application of credit to the customer's account. As a result of notification, the merchant or the customer (or both) are made aware of the status of the return while it is still in transit.

In other embodiments, notification to the merchant and/or consumer could occur at different stages of the process of FIG. 8. Essentially, the notification(s) may occur anytime after the package has been scanned in Step 402. In general, implementing notification at a point early in the process achieves the goal of promptness, whereas later in the process, more information about the package and the return (such as after the package is opened) can be delivered. If desired, early notification can be complemented with a tracking system that permits the merchant and/or customer to obtain additional data about the return. The notification process can include separate "return confirmation" notices and "credit notification" or these notifications may be combined.

If desired, merchant and/or customer visibility into the returns process can be achieved at various "touchpoints". For customers, these touchpoints include access to the status of the return via call centers, email communications, postcard delivery, and websites. Data about the return can be made available by the returns center to any of these systems. Customer satisfaction is greatly enhanced because the customer knows that his or her return is being handled—that the package has been received, that a credit or exchange is in progress, and whether that the shipping fee is being debited.

Notification can be complemented with self-service tracking, such as by website or call center. The customer is then able to either passively receive notification or actively inquire about returns status. In some embodiments, returns data may be transmitted electronically from the returns center to a merchant-maintained data center. This permits customer notifications and tracking to be achieved directly under the merchant "branding", such as through the merchant's website or call center.

The various options for notifying the customer and/or merchant, the contents of the notice, and the transmittal of tracking data to a tracking system, are all determined by merchant notification rules. These rules may be stored in processing system 119 and accessed in Step 413.

Steps 411-415 are performed at a package opening station, and involve "item level" handling. Step 411 is opening the package. Step 412 viewing the order on a display screen, the order having been correlated to the package identifier (already scanned in Step 402 or rescanned in Step 412a) and accessed using processing system 119 in Step 408. Step 414 is identifying the return item in the package.

Step 415 is signaling to processing system 119 that a credit is due the customer. Step 410 is handling the credit, if called for by merchant rules, and in the manner called for by the rules.

If desired, an additional step performed at the opening station could be scanning the item itself, for an SKU number or other item information to be added to the data file for the returned item. Opening and identifying returns is made more efficient with the use of scannable barcodes and touchscreens, eliminating the inefficiencies and inaccuracies found in hand-keying.

Steps 4 label 420-422 are performed at a dispositioning station. Step 4 label 20 is examining the item. Step 421 is determining the disposition of the item. Step 421 is performed in accordance with disposition rules provided by the merchant and stored in processing system 119 in Step 409. Items may be dispositioned by factors such as SKU, value, age, or zip. Step 422 is sorting the item according to its disposition. The various dispositions may include return-to-stock (RTS), return to vendor (RTV), liquidate, send to outlet, destroy, or recycle. Various "return to fulfillment" options may be provided in addition to return to vendor.

Steps 430-432 are performed at a staging station. In Step 430, package containers are placed in outbound lanes. In Step 431, the returns provider generates bills of lading. In Step 432, the returns provider notifies the carrier that the container is ready for pickup.

The process described above provides for processing of returns at the item level. That is, the package is opened, sorted, and dispositioned out of the package in which it was returned. Items may be poly-bagged or otherwise re-packaged and labeled according to return rules specified by the merchant and stored in processing system 119. A simpler implementation of the process would eliminate the package opening and examination and sorting at the item level, and packages would be handled, re-labeled, and aggregated at the package level.

Regardless whether the returns center handles returns at the package level or item level, the returns center is capable of multi-level sorts. As indicated above in connection with FIG. 8, the final sort is typically on the basis of the package's (or item's) final disposition. However, prior to that, sorting can be determined from flag 22 or barcode 25, at any level desired by the merchant. For example, at a product category level, all shoes may be routed to a specialist for examining.

In the example of FIGS. 1 and 8, the services incorporate use of a shipping due return label, such as label 20, which has machine readable coding. However, the methods of FIG. 4 could be easily adapted to postage paid packages, such as by eliminating the manifesting steps for such packages.

The following table provides a detailed description of the various tasks that may be performed at a returns center, such as the returns center of FIG. 1. Returns with various types of labels, whether in accordance with label 20 or having less or no machine readable data, may be received at the returns center. The level of returns processing (the type and number of the tasks that are performed) is determined by the type of label and the merchant's returns rules. Inbound packages to the returns center can be sorted for value-added services or passed through to dispositioning without additional services.

| Requirement Name | Description |
| --- | --- |
| Value Added Center, System Setup | |
| Support for all return types | System must be able to process packages and items from any inbound source, including:<br>Neighborhood return stores<br>Packaged mailing label<br>Web-based mailing label<br>Self-paid Label (e.g., not pre-paid and without bar-code) |
| Value-added or delivery-only | System must support setup of merchant selection for value-added (full-service) or delivery-only handling |
| Rules-based inbound package sort | System must support setup of inbound package routing rules.<br>Package rules must support merchant selection<br>Package rules must support size-based conditions.<br>Package rules must support weight-based conditions |
| Rules-based Routing/ Disposition | System must support setup of merchant item routing/disposition rules.<br>Item rules must support value-based conditions.<br>Item rules must support size-based conditions.<br>Item rules must support weight-based conditions.<br>Item rules must support SKU-based conditions.<br>Item rules must support specification of an item label |
| Rules-based Inventory Hold/Delivery thresholds | System must support setup of Merchant rules controlling Inventory Hold/Delivery thresholds.<br>Rules must support volume (trailer load) options.<br>Rules must support time-limit options.<br>Rules must support disposition types<br>Rules must support item category types<br>Rules must support vendor types |
| Multiple Merchant/RTS locations | System must support setup of merchant locations, including multiple Return-to-Stock (RTS) locations<br>Locations are driven by SKUs. |
| 3$^{rd}$ party locations | System must support setup of other delivery locations, including outlets, donation centers, liquidation tent-sale sites. |
| Rules-based RTV processing | System must support setup of Vendor return processing rules<br>ability to notify Vendor based on time-based thresholds<br>ability to notify Vendor based on volume-based thresholds<br>ability to notify Vendor based on SKU-based thresholds<br>support for electronic notification methods, including email and fax. |
| Merchant Product ID Setup | System must be able to setup merchant product Ids, by receiving product identifier data from merchant. |
| Multi-carrier support (inbound) | Ability to support multiple inbound transportation carriers. |
| Multi-carrier support (outbound) | Ability to support multiple outbound transportation carriers. |

| Requirement Name | Description |
|---|---|
| Number of VACs | |
| | Value-added Center: Receive |
| Scan | Label must be scanned |
| | Merchant label, if bar coded, must be scanned. |
| | Must support scans of multiple merchant bar codes on a single label, in order to uniquely identify order. |
| | If label is not scanned, package must be identified and recorded in some other manner. |
| | Scan must record receipt of package, with date recorded as GMT. |
| | Scan must record destination of package, if applicable. |
| | Scan must record full bar code information, up to 64 bits. |
| | Scan must record inbound carrier source. |
| | Scan must record package tracking number, if applicable. |
| | Scan station must support data entry. |
| Damage check | Must examine package for damage. |
| | Criteria should be broad: either "package OK" or "package destroyed" |
| | Default is "package OK" |
| | Results of inspection must be recorded. |
| | Setup must be configurable by facility. |
| Weigh | Each package, regardless of destination, must be weighed. |
| | Package weight must be recorded in the system. |
| | Weight shall be recorded in pounds in four decimal places, accurate to two decimal places. |
| Inbound Package Sort | Packages must be sorted according to destination (merchant, warehouse/location). |
| | Damaged packages must be separated and processed separately. |
| | Must permit routing of "pass through" packages without value-added processing, or "value added" packages. |
| License Plate support | Ability to assign a unique ID to inbound pre-paid packages without a label, including a merchant ID and facility ID. |
| Multiple barcode support | Ability to record multiple barcodes on inbound package. |
| | Value-added Center: Identify |
| Opening | Open all packages routed for value-added processing |
| Documentation | Extract documentation from package. |
| Item Identification | Match items to documentation or RMA, if applicable. |
| | Verify that items can be properly identified |
| | Verify that the items match the documentation (paper) |
| | Verify that the items match the documentation (electronic) |
| | Record item identification |
| | Record item return reason |
| | Record item return type (return, exchange or gift) |
| | Record item inspection data, if any |
| | Record item quantity |
| Notification to Merchant | Provide return data to merchant enabling credit notification |
| | Provide item disposition data to merchant |
| | Provide package receipt and tracking notification to merchant |
| | Support for multi-invoice returns |
| | Support for multi-package return |
| | Frequency of notification to merchant |
| Disposition & Destination Sort: RTM only (Rules-based) | Support for the following Disposition types: |
| | RTM (return-to-merchant) |
| | Route item according to Merchant business rules |
| | Record routing of each item |
| | Follow Merchant rules for disposition and destination. |
| | Support for multiple sorts |
| Disposition & Destination Sort: various (Rules-based) | Support for the following Disposition types: |
| | RTS (return-to-stock) |
| | RTV (return-to-vendor) |
| | Outlet |
| | Destroy |
| | Liquidate |
| | Route item according to Merchant business rules |
| | Record routing of each item |
| | Follow Merchant rules for disposition and destination. |
| | Support for multiple sorts |
| Disposition & Destination Sort: various (Exam-based) | Route item according to Merchant exam |
| | RTS (return-to-stock) |
| | RTV (return-to-vendor) |
| | Outlet |
| | Destroy |
| | Liquidate |
| | Record routing of each item |
| | Follow Merchant rules for disposition and destination. |
| | Support for multiple sorts |

-continued

| Requirement Name | Description |
| --- | --- |
| Vendor return Authorization | Support for vendor return authorization processes |
| Package & Dunnage Removal | Support for removing package and dunnage materials |
| Item labeling | Support production of item labels, based on internal rules |
| Inventory Aggregation & Hold | Collect and store items destined for a common location/destination. Support at both facility and system levels. |
| Non-deliverables support | Ability to process non-deliverable packages. |
| Poly-bagging support | Ability to support poly-bags for certain disposition types |
| Disposition & Destination Data Notification | Record and transmit data to neighborhood return center |
| Disposition Management | RTS: support for delabeling items |

Value added Center: Shipping

| Requirement Name | Description |
| --- | --- |
| Container Aggregation | Containerize packages or items for a common destination |
| Package identification | Identify the individual packages in a container |
| Container manifest | Generate a manifest for each container |
| | Record the container manifest in the system |
| | Identify containers destined for a common destination |
| Trailer/truck manifest | Generate a manifest for the trailer/truck |
| | Record the trailer/truck manifest in the system |
| | Record Bill-of-lading (BOL) in the system |
| Exception Handling/Research | Ability to access merchant customer history, including off-file data. |
| | Ability to create new customers in Merchant system |
| | Support for data entry |
| | Ability to identify multiple product attributes |
| | Support for customer change-of-address |
| | Support for the following scenarios: |
| | Cannot identify merchant |
| | Cannot produce an RMA |
| | Cannot identify item |
| | Cannot identify order |
| Re-box, re-kit, re-furbish | Re-package according to merchant fulfillment rules |
| Item labeling (per Merchant WMS) | Produce and apply item labels according to merchant rules, with no merchant integration |
| Item labeling (per Merchant WMS) | Produce and apply item labels according to merchant rules, with merchant integration |
| Forward Fulfillment | Provide forward fulfillment capabilities, including: |
| | integration with merchant order management system |
| | re-packaging, re-labeling as needed |
| | record and transmit data to processing center. |
| Aging | Support for merchant driven inventory-aging rules. |
| Proof of destruction | Support for merchant and/or vendor approved proof of destruction services. |
| Liquidation service | Support for value-added liquidation services. |
| Vendor inspection | Support for vendor inspection. |

Value-added Center: Carrier

| Requirement Name | Description |
| --- | --- |
| Final Ship Notification | Record and transmit the following: |
| | Delivery confirmation |
| Notification tracking | Ability to tracking notification information via a web site |

Value-added Center: Data Communications

| Requirement Name | Description |
| --- | --- |
| Neighborhood return center Integration | Transmit recorded data to processing center |
| | Frequency of data transmission is daily (end-of-day) at minimum |
| Package-level details | Record and transmit the following data for each package |
| | Date and time received (GMT) |
| | Date and time shipped (GMT) |
| | Merchant |
| | Package identifier |
| | Package carrier source (e.g., FedEx, USPS) |
| | Package weight |
| | Package destination |
| | Package bar code |
| | Package condition |
| | Package routing, if applicable (e.g., facility to facility) |
| | Type of service, including "value-add" or "pass-through" |
| Item-level details | Record and transmit the following data for each item: |
| | Date and time scanned |
| | Item identifier |
| | Order line number/identifier |
| | Item matches documentation flag |
| | Disposition |
| | Destination |
| | Return reason |
| | Return type |
| | Sort or slot, if applicable |
| | Pallet ID, if applicable |
| | Container ID, if applicable |

| Requirement Name | Description |
| --- | --- |
| Outbound Manifests Bills of Lading/Manifests | Provide bills of lading for each pallet/container<br>Provide bills of lading for each truck/trailer load<br>Bill of lading must identify packages, for "pass-through" customers<br>Bill of lading must identify items, for "value add" customers<br>Each bill of lading shall be transmitted to processing center<br>Transmission shall take place no more than 24 hours after shipment |
| Vendor RA Notification | Support for electronic notification, including smtp, ftp, fax and/or Interactive Voice Response (IVR) system.<br>Configurable by vendor and/or merchant. |
| Final Ship Notification | Record and transmit the following:<br>Pickup notification<br>Pickup confirmation |
| Billing Support | Record and transmit all data required to bill partners and merchants. |
| Carrier Manifest Support | Support for reporting and sampling necessary to fulfill Manifest requirements. |
| Priority Mail Support | |
| Capture in PacSys if a package was sent Priority Mail | During the scanning and weighing process, must capture if a package was sent by a consumer using the USPS Priority Mail service. This capability is configurable by merchant, and optional depending on merchant rules (similar to a balloon flag) |
| Pass Priority Mail notification | For each Priority Mail package scanned at the warehouse facility, the system must pass the appropriate notification.<br>Must be included in both the 221 CSV transmission and the nightly FTP file |
| Capture if a package was sent using Priority Mail | The system must accept notification from the carrier if a package was sent using Priority Mail. |
| Configure the electronic manifest to act upon the Priority Mail notification | The electronic manifest must be able to include or remove Priority Mail packages from the postal billing calculation. |
| Rate Priority Mail packages within the manifesting process | The system must use the Priority Mail notification to correctly assess postage for all Priority Mail packages. |
| Remove Priority Mail packages from electronic manifest document | The system must remove all packages identified as being sent Priority Mail before the electronic manifest is created. |

Reverse Manifesting

As indicated above in connection with Step 114 of FIG. 1, when the carrier's shipping costs are paid at a returns center, the returns provider performs package manifesting. For the purposes of this description, "manifesting" means an automated method of accounting for packages received at a facility during a particular time period (typically one day) and assessing the shipping charges.

As stated above, the manifesting performed by the returns provider is "reverse manifesting", in the sense that packages have already been shipped. Underlying the need for reverse manifesting, is the willingness of the carrier to permit "shipping due" delivery. The merchant pays the cost of the returns through its returns provider. Typically, the shipping charge is ultimately deducted from the customer's credit for the return.

Figure 9:
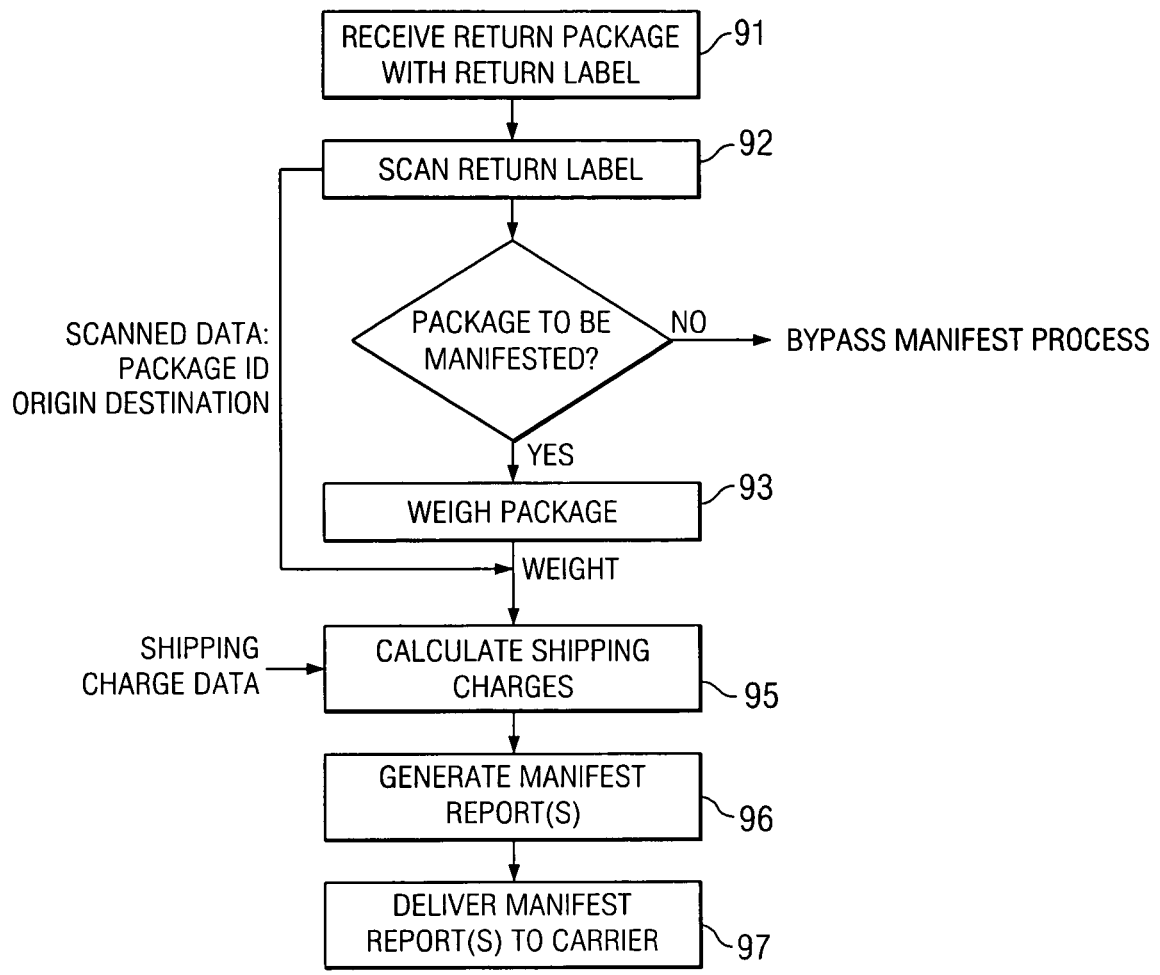
FIG. 9 illustrates a reverse manifesting method in accordance with the invention.

FIG. 9 illustrates a reverse manifesting method in accordance with the invention. The method of FIG. 9 is an example of a manifesting method that may be used as a part of Step 114 of the returns processing method of FIG. 1 and Step 407 of FIG. 8. The process of FIG. 9 may be performed using one or more client systems for acquiring return label data and weighing packages and a central processing system for calculating and generating reports (as shown in FIGS. 1 and 8). Or a single processing system may be used to perform all tasks of FIG. 9.

Step 91 is performed at a returns center, and entails receiving a return package from the customer via the carrier. It is assumed that the package is shipping due, and has a return label (such as label 20 described above) with machine readable package attribute data. This data includes at least a package identification, an indication of the package origin, and an indication of the delivery location. Examples of these types of data are an invoice number for the package identification, and zip codes for the origin and destination. As discussed above, the machine readable data may be bar code data (such as barcode 25) or any other type of machine readable data.

The return label 20 discussed above in connection with FIGS. 2 and 3 is an example of a suitable return label for manifesting purposes, having barcode 25 with the above-described manifesting data. As also discussed above, the destination location may be a returns center or a carrier station near the returns provider.

In Step 92, the machine readable data on the return label is scanned (or otherwise read). This data is electronically delivered to processing system 119.

Step 92 may indicate that a package is not to be manifested, such as might be the case for packages in which shipping is pre-paid. If this is the case, the package bypasses the manifesting process.

In Step 93, the package is weighed. The weight data is also electronically delivered to processing system 119. During Step 93, other shipping attribute data of the package may also be collected (manually or automatically) and delivered to processing system 119. For example, the shipping attribute data may be information about package dimensions or about special handling attributes such as priority mailing.

Step 95 is calculating shipping charges for each package. The data for each package is correlated to create a package-level detail file. Processing system 119 has memory that stores the rate data of the carrier, and is programmed with whatever software is necessary to receive the manifest data and postal attribute data and to calculate shipping charges.

Step 76 is creating a manifest detail report that inventories each package and its relevant information (weight, zone, mail class, special characteristics, and rate). A summary report may also be created, detailing the total weight, pieces, and shipping cost of each type of parcel (priority, parcel post, intra-BMC, etc) in that delivery.

In Step 77, the manifest report (in electronic form) is transmitted (such as by e-mail) to the carrier. For example, where the carrier is the USPS, the report is delivered to a USPS clerk responsible for shipping cost assessment. The USPS clerk uses the manifest shipping cost due total to deduct shipping charges from the appropriate account.

The extent to which Steps 92-97 are automated can vary, but in general, the implementation of Steps 92 and 93 use machine-reading and a weight data processes, respectively. These processes may be client components of processing system 119, installed at a single reading/weighing station or at separate stations of the returns center 114. Communications between these client processes and the centralized components of processing system 119 can be by any means, including LANs, WANs, wireless, etc.

Alternatively, the processes of Steps 92 and 93 may be implemented with the same processing hardware as processing system 119. Various architectures are possible. Processing system 119 may be "centralized" such that it is local to the returns center or such that it serves a number of returns centers. The rate data received by the processing system 119 in Step 95 may be stored in any database memory accessible by processing system 119.

The method of FIG. 9 is typically performed by batch (periodically), such that the manifest report represents all shipping costs due at a returns center on a single day. This automated manifest mailing system allows the returns provider to document shipping charges for all pieces in a specific mailing and pay for that mailing via a permit imprint. In other words, no actual shipping-paid indicia, such as stamps or a metered strip, is attached to a package. In the example of this description, where the carrier is the USPS, charges are paid through a Permit Imprint Advance Deposit Account, a payment method that is set up with the Postal Service.

FIG. 10 illustrates an example of one page of a manifest detail report 1000. A first field 1001 is a package ID field, from the data collected during Step 92. A second field 1002 is a zone field, determined by the origin and destination data collected during Step 92. A third field 1003 is a weight field, obtained during Step 93. A description field 1004 describes the particular shipping service. A rate field 1005 is calculated by processing system 119, using the data collected Steps 92 and 93.

In various embodiments of the invention, the packages received in Step 91 could be received from more than one carrier. In these embodiments, the return label would also identify the carrier, using machine readable or human readable coding or other indicia, so that manifest data could be separately calculated for each carrier.

What is claimed is:

1. A method, performed by a returns provider on behalf of a plurality of merchants, of calculating shipping costs due to a carrier in connection with customer returns of items, comprising the steps of:
receiving, from a carrier, a postage due package containing at least one returned item at a returns center, wherein the postage due package requires that shipping charges are to be calculated and paid after the item is received at the returns center and wherein the returns center is associated with a third party other than the plurality of merchants and the carrier;
wherein affixed to each package is a printed label, the label having machine readable package attribute data comprising data representing at least a package identifier, the machine readable attribute data further comprising data representing manifesting data comprising at least the origin of the package and a delivery location;
upon receiving the postage due package at the returns center, scanning the machine readable data to obtain the data representing the manifesting data on each package and to identify a selected one of the plurality of merchants;
upon receiving the postage due package at the returns center, weighing the postage due package, thereby obtaining weight data;
delivering the manifesting data and the weight data to a computer processing system;
storing shipping rate data in the computer processing system; and
using the computer processing system at the returns center to calculate a shipping cost for the postage due package, the shipping cost calculated based on the manifesting data obtained from the machine readable data on the printed label and the weight data obtained as a result of weighing the postage due package at the returns center.

2. The method of claim 1, wherein the carrier is the United States Postal Service.

3. The method of claim 1, wherein the receiving step is performed by receiving packages from multiple carriers, wherein a sorting step follows the receiving step.

4. The method of claim 1, wherein the package identification is an invoice number of an invoice associated with the returned item.

5. A method, performed by a returns provider, of calculating shipping costs due to a carrier in connection with customer returns of items, comprising the steps of:
receiving, from a carrier, postage due packages containing returned items at a returns center, wherein the postage due package requires that shipping charges are to be calculated and paid after the item is received at the returns center and wherein the returns center is associated with a third party other than the plurality of merchants and the carrier;
wherein affixed to each package is a printed label, the label having machine readable package attribute data, the machine readable package attribute data comprising data representing at least:
the origin of the package identified by the zip code of the customer returning the item; and
the delivery location of the package;
reading the manifesting data on each package;
weighing each package, thereby obtaining weight data;
delivering the manifesting data and the weight data to a computer processing system at the returns center;
using the computer processing system at the returns center to calculate a shipping cost for each postage due package, the shipping cost calculated based on the manifesting data obtained from the machine readable package attribute data on the printed label and the weight data obtained as a result of weighing the postage due package at the returns center; and
storing shipping rate data in the computer processing system.

6. A method, performed by a returns provider, of calculating shipping costs due to a carrier in connection with customer returns of items, comprising the steps of:
receiving, from a carrier, postage due packages containing returned items at a returns center, wherein the postage due package requires that shipping charges are to be calculated and paid after the item is received at the returns center and wherein the returns center is associated with a third party other than the plurality of merchants and the carrier;

wherein affixed to each package is a printed label, the label having machine readable package attribute data, the machine readable package attribute data comprising data representing at least:

the origin of the package; and the delivery location of the package identified by the zip code of the returns center;

reading the manifesting data on each package;

weighing each package, thereby obtaining weight data;

delivering the manifesting data and the weight data to a computer processing system at the returns center; and using the computer processing system at the returns center to calculate a shipping cost for each postage due package, the shipping cost calculated based on the manifesting data obtained from the machine readable package attribute data on the printed label and the weight data obtained as a result of weighing the postage due package at the returns center; and storing shipping rate data in the computer processing system.

7. The method of claim 1, wherein the destination data is the zip code of a carrier station near the returns center.

8. The method of claim 1, further comprising the step of determining package dimensions, and delivering the package dimensions to the processing system.

9. The method of claim 1, wherein the step of using the processing system to calculate shipping costs is performed for periodic batches of packages.

10. The method of claim 1, further comprising generating a package level manifesting report.

11. The method of claim 10, further comprising delivering the manifest report to the carrier in electronic form.

12. The method of claim 1, wherein scanning the machine readable package attribute data further comprises reading data indicating that manifesting is to be performed.

13. A system for calculating shipping costs due to a carrier in connection with customer returns of items, comprising:

a scanning station configured to:

receive a postage due package containing at least one returned item, wherein affixed to each package is a printed label, the label having machine readable package attribute data representing at least a package identifier, manifesting data, and a merchant identifier, the postage due package received from a carrier at a returns center providing returns services on behalf of a plurality of merchants, wherein the postage due package requires that shipping charges are to be calculated and paid after the item is received at the returns center and wherein the returns center is associated with a third party other than the plurality of merchants and the carrier;

scan the machine readable package attribute data to obtain the manifesting data and to identify a selected one of the plurality of merchants, the machine readable package attribute data comprising data identifying both an origin of the package and a delivery location; and weigh the package to obtain weight data;

a computer processing system at the returns center, the computer processing system in communication with the scanning station, the computer processing system configured to:

receive the manifesting data and the weight data from the scanning station;

maintain shipping rate data; and calculate a shipping cost for the postage due package, the shipping cost calculated based on the manifesting obtained from the machine readable package attribute data on the printed label and the weight data obtained as a result of weighing the postage due package at the returns center.

14. The system of claim 13, wherein the scanning station is operable to receive the postage due package from the United States Postal Service.

15. The system of claim 13, wherein the processing system is operable to maintain the shipping rates of multiple carriers.

16. The system of claim 13, wherein the package identification is an invoice number of the invoice associated with the returned item.

17. The system of claim 13, wherein the origin data is the zip code of the customer returning the item.

18. The system of claim 13, wherein the manifesting data comprises the zip code of the returns center.

19. The system of claim 13, wherein the manifesting data comprises the zip code of a carrier station near the returns center.

20. The system of claim 13, wherein the processing system is further operable to receive shipping attribute data other than weight data.

21. The system of claim 20, wherein the shipping attribute data other than weight data comprises package dimension data.

22. The system of claim 20, the shipping attribute data other than weight data comprises special handling data.

23. The system of claim 13, wherein the processing system is further operable to generate a package level manifest report.

24. The system of claim 23, wherein the processing system is further operable to deliver the manifest report to the carrier in electronic form.

25. The system of claim 13, wherein the machine readable manifesting comprises RFID data.

* * * * *